United States Patent
Pogde et al.

(10) Patent No.: US 10,055,420 B1
(45) Date of Patent: Aug. 21, 2018

(54) METHOD TO OPTIMIZE RANDOM IOS OF A STORAGE DEVICE FOR MULTIPLE VERSIONS OF BACKUPS USING INCREMENTAL METADATA

(71) Applicant: EMC Corporation, Hopkinton, MA (US)

(72) Inventors: Prashant Pogde, Sunnyvale, CA (US); Yamini Allu, Santa Clara, CA (US); Mahesh Kamat, San Jose, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 339 days.

(21) Appl. No.: 14/788,598

(22) Filed: Jun. 30, 2015

(51) Int. Cl.
  *G06F 7/00* (2006.01)
  *G06F 17/00* (2006.01)
  *G06F 17/30* (2006.01)
  *G06F 11/14* (2006.01)

(52) U.S. Cl.
  CPC .... *G06F 17/30132* (2013.01); *G06F 11/1453* (2013.01); *G06F 17/30212* (2013.01); *G06F 17/30221* (2013.01); *G06F 2201/00* (2013.01)

(58) Field of Classification Search
  CPC .................... G06F 17/30156; G06F 17/30132
  See application file for complete search history.

(56) References Cited

U.S. PATENT DOCUMENTS

| | | | |
|---|---|---|---|
| 7,873,601 B1 * | 1/2011 | Kushwah | G06F 11/1451 707/654 |
| 8,260,792 B1 | 9/2012 | Hsu | |
| 8,290,972 B1 * | 10/2012 | Deshmukh | G06F 17/30489 707/758 |
| 8,700,578 B1 | 4/2014 | Varadan | |
| 8,751,515 B1 | 6/2014 | Xing | |
| 8,806,115 B1 | 8/2014 | Patel | |
| 8,880,787 B1 | 11/2014 | Kimmel | |
| 8,892,818 B1 | 11/2014 | Zheng | |
| 9,063,842 B1 | 6/2015 | Fair | |
| 9,110,599 B1 | 8/2015 | Fair | |
| 9,152,335 B2 | 10/2015 | Sundaram | |
| 9,189,402 B1 | 11/2015 | Smaldone et al. | |
| 9,189,414 B1 | 11/2015 | Shim | |
| 9,195,672 B1 | 11/2015 | Pang | |
| 9,223,679 B1 | 12/2015 | Ho | |
| 9,304,914 B1 | 4/2016 | Douglis | |

(Continued)

*Primary Examiner* — Van Oberly
(74) *Attorney, Agent, or Firm* — Womble Bond Dickinson (US) LLP

(57) ABSTRACT

Methods, systems, and apparatus for optimizing a cache memory device of a storage system are described. In one embodiment, a first base segment tree representing a first full backup including data and metadata describing the data is cached in a cache memory device. Subsequently, a plurality of incremental segment trees representing incremental backups to the first full backup are cached in the cache memory device. Each of incremental segment trees corresponding to the changes to the first full backup, without modifying the first base segment tree in response to the changes. At least two of the incremental segment trees are merged into an updated incremental segment tree to reduce a storage space of the cache memory device to store the incremental segment trees. The updated incremental segment tree comprises data and metadata represented by two or more incremental segment trees.

18 Claims, 14 Drawing Sheets

(56) References Cited

U.S. PATENT DOCUMENTS

| | | |
|---|---|---|
| 9,336,143 B1 | 5/2016 | Wallace et al. |
| 9,383,936 B1 | 7/2016 | Freitas |
| 9,390,116 B1 | 7/2016 | Li et al. |
| 9,396,071 B1 | 7/2016 | Akanda |
| 9,405,761 B1 | 8/2016 | Botelho |
| 9,430,156 B1 | 8/2016 | Shilane |
| 9,460,025 B1 | 10/2016 | Wallace |
| 9,483,494 B1 | 11/2016 | Pang |
| 9,529,731 B1 | 12/2016 | Wallace |
| 9,569,367 B1 | 2/2017 | Wigmore |
| 9,594,674 B1 | 3/2017 | Mondal |
| 9,594,753 B1 | 3/2017 | Pang |
| 9,600,200 B1 | 3/2017 | Wallace et al. |
| 9,600,487 B1 | 3/2017 | Pandian |
| 9,606,914 B2 | 3/2017 | Thatcher |
| 9,626,332 B1 | 4/2017 | Panchanathan |
| 9,715,434 B1 | 7/2017 | Xu |
| 9,740,422 B1 | 8/2017 | Ozdemir |
| 2011/0307654 A1 | 12/2011 | Ma et al. |
| 2012/0030477 A1 | 2/2012 | Lu et al. |
| 2012/0254174 A1 | 10/2012 | Mitra |
| 2012/0254565 A1 | 10/2012 | Mitra |
| 2014/0064048 A1* | 3/2014 | Cohen .................. G06F 3/0613 369/47.15 |
| 2015/0112939 A1 | 4/2015 | Cantwell |
| 2015/0248443 A1 | 9/2015 | Golander |
| 2016/0210044 A1 | 7/2016 | Mitkar |

* cited by examiner

METHOD TO OPTIMIZE RANDOM IOS OF A STORAGE DEVICE FOR MULTIPLE VERSIONS OF BACKUPS USING INCREMENTAL METADATA

RELATED APPLICATIONS

This application is related to co-pending U.S. patent application Ser. No. 14/788,184, entitled "SPARSE SEGMENT TREES FOR HIGH METADATA CHURN WORKLOADS," filed Jun. 30, 2015, which is incorporated by reference in its entirety.

FIELD

Embodiments of the present invention relate generally to data storage systems. More particularly, embodiments of the invention relate to a sparse metadata tree for accessing and writing data in a storage system.

BACKGROUND

Data storage is a critical component for computing. In a computing device, there is a storage area in the system to store data for access by the operating system and applications. In a distributed environment, additional data storage may be a separate device that the computing device has access to for regular operations. In an enterprise environment, the stored data in the storage area of the computing device or additional data storage often accesses one or more offsite storage devices as a part of a disaster recover (DR) strategy to protect the entire organization by having one or more copies of data at offsite locations.

In at least one presently available storage system, files are backed up by (i) creating a full backup of the files on storage media (e.g., disks, SSDs, etc.) of the storage system and (ii) creating one or more periodic full backups thereafter. Each file is stored in the storage system after the corresponding file has been processed into multiple data structures that represent the data and metadata of the corresponding file. These multiple data structures are generally used for accessing, reading, or updating the corresponding file. With regard to single file, a data structure representing a small amount of metadata that is common to a large amount of data of the file can be used to reference or point to the multiple data structures representing the large amount of data of the file. This pointing technique of using a small amount of metadata to point to a large amount of data has the advantage of minimizing the overhead associated with storing metadata in the storage system. This pointing technique, however, is not ideal for all types of backups—for example, incremental backups, etc.

An incremental backup and its variations are generally characterized as backups that store only the data and metadata of the files of a full backup that have changed, without storing the data and metadata of the files of the full backup that have not changed. Usually, the changes to the data and metadata of the files of the full backup that are captured by an incremental backup typically represent only a small proportion of the data of the full backup. This makes incremental backups much smaller and quicker than full backups. Nevertheless, as each incremental backup is stored on the storage system, a full copy of the files that are backed up on the storage system needs to be represented on the storage system in the event that a full restoration of files is needed. When the pointing technique described above is used for accessing, reading, or updating changes to the data of the files of the full backup, the overhead of updating and storing a small amount of metadata that is common to a large amount of data can be extremely expensive. This is because each time a small subset of the large amount of data is updated, then the entirety of the small amount of metadata that is common to the large amount of data must also be updated. In some situations, this can cause the small amount of metadata to be in a perpetual state of being updated. Consequently, updating this small amount of metadata can be as expensive as the updating the large amount of data that is referenced by the small amount of metadata. Furthermore, the continual process of updating the small amount of metadata can create a high churn, which can consequently reduce the life expectancy of the storage devices storing or caching the small amount of metadata.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
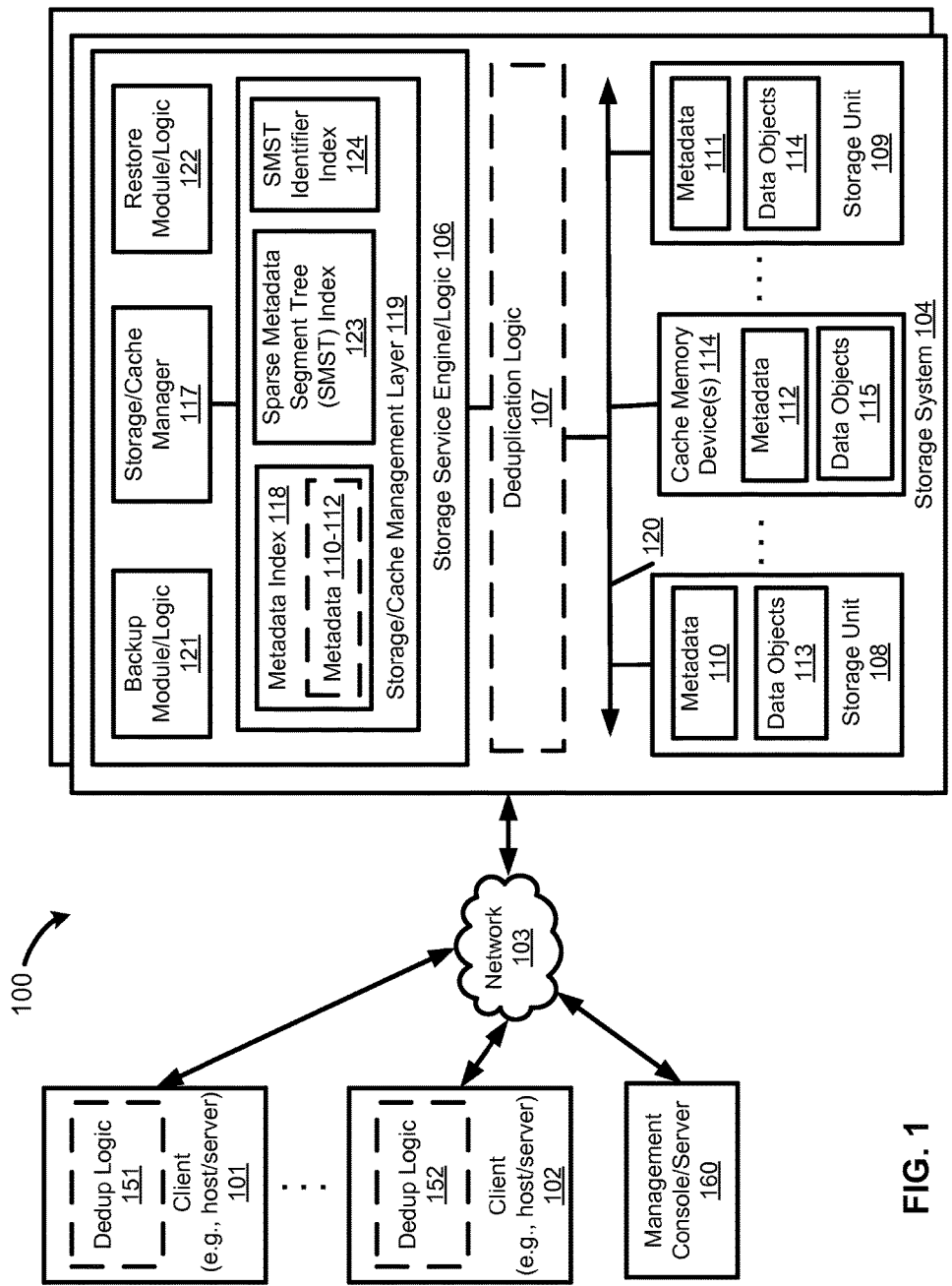
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to one embodiment, one or more sparse metadata segment trees (SMSTs) are used to assist with provision of data storage services of a deduplicated storage system by improving the efficiency of accessing, reading, or updating (also referred to as writing or overwriting) one or more files stored within the deduplicated storage system. In one embodiment, a deduplicated storage system receives a first file representing a file that is fully backed up from one or more clients. In one embodiment, the first file includes data in form of a plurality of deduplicated segments and metadata describing the deduplicated segments. In one embodiment, the deduplicated storage system stores the first file in a storage disk of the deduplicated storage system in response to receiving the first file. In one embodiment, the deduplicated storage system caches the metadata of the first file in a cache memory device. In one embodiment, the metadata is cached in a first segment tree (also referred to a base segment tree) having multiple layers of nodes in a tree hierarchy. In one embodiment, the first segment tree (also referred to a base segment tree) is a Merkle tree of segments having multiple layers.

In one embodiment, the deduplicated storage system receives a second file representing an incremental backup of the first full backup. In one embodiment, the second file includes data of the incremental backup in form of a plurality of deduplicated segments and metadata describing the deduplicated segments. In one embodiment, the deduplicated storage system stores the second file in the storage disk in response to receiving the second file. In one embodiment, the deduplicated storage system caches the metadata of the second file as a second segment tree in the cache memory device. The second segment tree can also be referred to herein as a sparse metadata segment tree (SMST). In one embodiment, the second segment tree (also referred to as the SMST) is a Merkle tree of segments having multiple layers. In one embodiment, the second segment tree (also referred to as the SMST) describes changes to the deduplicated segments of the first fully backed up data in view of the incremental backup without caching any of nodes of the first segment tree (also referred to as the base segment tree) again. In one embodiment, the deduplicated storage system uses the first segment tree (also referred to as the base segment tree) and the second segment tree (also referred to as the SMST) to collectively represent a second full backup based on the incremental backup and the first full backup.

In one embodiment, the multiple layers of nodes of each of the first segment tree (also referred to as the base segment tree) and the second segment tree (also referred to as the SMST) includes a root node referencing multiple intermediate nodes. In one embodiment, each intermediate node references one or more leaf nodes. In one embodiment, each leaf node includes one of the deduplicated segments. In one embodiment, a parent node includes a fingerprint of each of its one or more child nodes.

In one embodiment, each of the multiple nodes of the second segment tree (also referred to as the SMST) includes a reference to a corresponding one of the multiple nodes of the first segment tree (also referred to as the base segment tree). In one embodiment, the second segment tree (also referred to as the SMST) includes only nodes associated with deduplicated segments that are absent from the first full backup, without containing nodes corresponding to deduplicated segments that exist in the first full backup represented by the first segment tree (also referred to as the base segment tree). In one embodiment, the deduplicated storage system stores one or more second segment trees (also referred to as SMSTs) in a storage unit or disk. In one embodiment, each of the one or more second segment trees (also referred to as SMSTs) contain metadata describing one of a plurality of versions of a file.

In one embodiment, the deduplicated storage system receives a request to restore the second full backup. In one embodiment, the request is received from one or more clients. In one embodiment, the deduplicated storage system retrieves a first set of deduplicated segments based on the first segment tree (also referred to as the base segment tree) in response to receiving the request to restore the second full backup. In one embodiment, the deduplicated storage system also retrieves a second set of deduplicated segments based on the second segment tree (also referred to as the SMST). In one embodiment, the deduplicated storage system merges deduplicated segments of nodes of the first segment tree (also referred to as the base segment tree) with deduplicated segments of nodes of the second segment tree (also referred to as the SMST) that reference the corresponding nodes of the first segment tree. In one embodiment, the deduplicated storage system returns merged deduplicated segments as the second full backup to the one or more clients that made the request.

In one embodiment, each of the one or more second segment trees that are incremental trees (also referred to as SMSTs) references the first segment tree (also referred to as the base segment tree) and zero or more of other second segment trees that are incremental trees (also referred to as SMSTs) that also reference to the base segment tree. In one embodiment, the one or more second segment trees that are incremental trees (also referred to as SMSTs) represent differences amongst the versions of the file.

FIG. 1 is a block diagram illustrating a storage system 100 according to one embodiment of the invention. In one embodiment, storage system 100 is a deduplicated storage system. In one embodiment, system 100 includes, but is not limited to, one or more client systems 101-102 communicatively coupled to storage system 104 over network 103. Clients 101-102 may be any type of clients such as a host or server, a personal computer (e.g., desktops, laptops, and tablets), a "thin" client, a personal digital assistant (PDA), a Web enabled appliance, or a mobile phone (e.g., Smartphone), etc. Alternatively, any of clients 101-102 may be a primary storage system (e.g., local data center) that provides storage to other local clients, which may periodically back up the content stored therein to a backup storage system (e.g., a disaster recovery site or system), such as storage system 104. Network 103 may be any type of networks such as a local area network (LAN), a wide area network (WAN) such as the Internet, a fiber network, a storage network, or a combination thereof, wired or wireless. Clients 101-102 may be in physical proximity or may be physically remote from one another. Storage system 104 may be located in proximity to one, both, or neither of clients 101-102. In one embodiment, clients 101-102 make requests, via network 103, to storage system 104 to backup or restore data from or to clients 101-102.

Storage system 104 may include or represent any type of server or a cluster of one or more servers (e.g., cloud servers). For example, storage system 104 may be a storage server used for various different purposes, such as to provide multiple users or client systems with access to shared data and/or to back up (or restore) data (e.g., mission critical data). Storage system 104 may provide storage services to clients or users via a variety of access interfaces and/or protocols such as file-based access protocols and block-based access protocols. The file-based access protocols may include the network file system (NFS) protocol, common Internet file system (CIFS) protocol, and direct access file system protocol, etc. The block-based access protocols may include the small computer system interface (SCSI) protocols, Internet SCSI or iSCSI, and Fibre channel (FC) protocol, etc. Storage system 104 may further provide storage services via an object-based protocol and Hadoop distributed file system (HDFS) protocol.

In one embodiment, storage system 104 includes, but is not limited to, at least one of deduplication logic 107, one or more storage units or devices 108-109, one or more cache memory devices 114 (also referred to as cache or cache devices), or storage service engine 106 (also referred to as service logic, service module, or service unit). In one embodiment, each of deduplication logic 107, storage unit(s) 108-109, cache device(s) 114, and storage service engine 106 may be implemented in software, hardware, or a combination thereof. In one embodiment, at least two of deduplication logic 107, storage unit(s) 108-109, cache device(s) 114, or storage service engine 106 is communicatively coupled to each other.

In one embodiment, deduplication logic 107 is configured to process or segment files stored in storage system 104 into multiple data segments (also referred to as data chunks, segmented chunks, or chunks) according to a variety of segmentation policies or rules. In one embodiment, each file is processed by the deduplication logic 107 into multiple data segments. In one embodiment, the deduplication logic 107 breaks a file into variable-length data segments or fixed-length data segments based on a variety of rules or considerations. For example, and in one embodiment, the file is broken into multiple data segments by identifying segment boundaries using a content-based technique (e.g., a function is calculated at various locations of a file, when the function is equal to a value or when the value is a minimum, a maximum, or other value relative to other function values calculated for the file), a non-content-based technique (e.g., based on size of the segment), or any other appropriate technique. In one embodiment, a segment is restricted to a minimum and/or maximum length, to a minimum or maximum number of segments per file, or any other appropriate limitation.

In one embodiment, deduplication logic 107 processes the created data segments to indicate their association with the file. In one embodiments, a fingerprint (also referred to as a deduplication key) is used to indicate that a particular one of the created data segments is associated with the file. In one embodiment, deduplication logic 107 passes segment association information (e.g., the fingerprint) to at least one of the metadata index 118, the SMST index 123, or the SMST identifier index 124. In one embodiment, deduplication logic 107 passes segment association information (e.g., the fingerprint) to at least one of storage unit(s) 108-109 or the cache device(s) 114. In one embodiment, when a file is to be retrieved, storage service engine 106 is configured to identify, via deduplication logic 107, appropriate data segments stored in storage unit(s) 108-109 or cache device(s) 114. In one embodiment, when a file is to be retrieved, storage service engine 106 performs the identification of the data segments using the fingerprints (also known as deduplication keys) found in at least one of indices 118, 123, or 124. In one embodiment, the storage/cache manager 117 communicates with at least one of indices 118, 123, or 124 to locate data segments in storage unit(s) 108-109 or cache device(s) 114.

In one embodiment, the data segments are stored or cached in storage unit(s) 108-109 or cache device(s) 114 within containers. In one embodiment, when data segments of a requested file are retrieved from the containers, the data segments are used to construct the requested file. In one embodiment, the reconstructed file is provided via network 103 back to one or more client(s) 101-102 in response to the request.

In one embodiment, deduplication logic 107 utilizes a hierarchical tree structure (e.g., a Merkle tree) of content-based identifiers (e.g., fingerprints) to associate a file with data segments and their locations in storage unit(s) 108-109 or cache device(s) 114. In the event that a data segment that is associated with a given file changes, the content-based identifiers will change and the changes will ripple from the bottom to the top of the hierarchical tree structure associated with the file efficiently since the appropriate content-based identifiers are easily identified using the tree structure. In one embodiment, the hierarchical tree structure that is used to represent a file with data segments is referred to throughout this specification as a base segment tree. Additional details about data segments and the base segment tree are provided below.

In one embodiment, the segmentation performed by deduplication logic 107 is performed in response to a request to store a file in storage unit(s) 108-109 or to cache a file in cache device(s) 114. In one embodiment, deduplication logic 107 may choose not to store a data segment associated with the file in storage unit(s) 108-109 or cache the data segment in cache device(s) 114 if the data segment is already stored in storage unit(s) 108-109 or cached in cache device(s) 114. In the event that deduplication logic 107 chooses not to store or cache the data segment, deduplication logic 107 stores or caches metadata information 110-112 enabling the reconstruction of the file using the previously stored data segment. As a result, a data segment associated with a file is stored in a deduplicated manner within one of storage units 108-109, cached in a deduplicated manner within one of cache memory devices 114, stored in a deduplicated manner across multiple storage units 108-109, or cached in a deduplicated manner across multiple cache memory devices 114. The metadata information 110-112 may be stored in storage unit(s) 108-109 or cache device(s) 114, such that files can be accessed independent of another storage unit or cache. In one embodiment, a copy of the metadata information 110-112 is stored on storage unit(s) 108-109 or cache device(s) 114 for files stored on the corresponding storage unit or cache so that files that are stored on the corresponding storage unit or cache can be accessed using only the information stored on the corresponding storage unit or cache.

In one embodiment, the metadata information 110-112 includes a file name, a fingerprint (or deduplication key) associated with segments of a file, an identification of a storage unit or cache device where the segments associated with the file name are stored or cached, reconstruction information for the file using the segments, and any other appropriate metadata information. In one embodiment, a main set of metadata information 110-112 can be reconstructed by using information of all storage units or caches associated with the storage system in the event that the main metadata is lost, corrupted, damaged, etc. Metadata 110-112 residing in storage unit(s) 108-109 or cache device(s) 114 can be reconstructed using metadata information stored on a main storage unit 110-112 or other storage unit or units (e.g., replica storage unit). Metadata information 110-112 further includes index information (e.g., location information or fingerprints of data segments). In one embodiment, metadata information 110-112 includes prime segment information that can be used to provide a consistent point of a file system and/or reconstruct a file system in the event of file system failure. In one embodiment, the index information of the metadata information 110-112 is stored in at least one of metadata index 118, SMST index 123, or SMST identifier index 124, which are discussed in further detail below.

Data deduplication is a process by which a data storage system (e.g., storage system 104) can detect multiple identical copies of data and only keep a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table (e.g., metadata index 118) of unique digests is created to find commonality among the data set. When a deduplicated data block is updated with a new content, a new data block is created containing the new updated content. Mapping of the deduplicated block is then changed to point to the new data block and the deduplicated block no longer points to the single copy of the data. This process is referred to as reduplication.

In one embodiment of system 100 of FIG. 1, any of clients 101-102 may include deduplication logic (e.g., deduplication logic 151-152) having at least a portion of functionalities of deduplication logic 107. Deduplication logic 151-152 are configured to perform local deduplication operations, respectively. For example, before transmitting data (e.g., a file) to storage system 104, each of the deduplication logic 151-152 may deduplicate the data into deduplicated segments and determine whether a particular deduplicated segment has already been stored in storage system 104. A deduplicated segment is transmitted to storage system 104 only if the deduplicated segment has not been stored in storage system 104. For example, and in one embodiment, when client 101 is about to transmit a data stream (e.g., a file or a directory of one or more files) to storage system 104, deduplication logic 151 is configured to deduplicate the data stream into deduplicated segments. For each of the deduplicated segments, client 101 transmits a fingerprint or representative of the deduplicated segment to storage system 104 to determine whether that particular deduplicated segment has already been stored in storage system 104. A deduplicated segment that has been stored in storage system 104 may be previously received from the same client 101 or from another client such as client 102. In response to a response from storage system 104 indicating that the segment has not been stored in storage system 104, that particular segment is then transmitted over to the storage system 104. As a result, the network traffic or bandwidth and the processing resources required can be greatly reduced.

In one embodiment, storage unit(s) 108-109 or cache device(s) 114 may be implemented locally (e.g., single node operating environment) or remotely (e.g., multi-node operating environment) via interconnect 120, which may be a bus and/or a network (e.g., a storage network or a network similar to network 103). Storage unit(s) 108-109 may include a single storage device such as a hard disk, a tape drive, a semiconductor memory, a plurality of storage devices such as a redundant array system (e.g., a redundant array of independent disks (RAID)), a system for storage such as a library system or network attached storage system, or any other appropriate storage device or system.

Note the terms "cache memory device," "cache device," and "cache" are used interchangeably within the specification.

In one embodiment, cache device(s) 114 include at least one of a volatile memory device or a non-volatile memory device. For example, and in one embodiment, cache device(s) 114 can be a non-volatile memory device such as a solid state drive (SSD), a flash memory device, a flash-based memory device, a peripheral component interconnect express (PCIe) connected flash memory, solid state device (SSD), magnetic tape, magneto-optical (MO) storage media, or other known non-volatile memory device that is known to be used as a cache memory device.

In one embodiment, storage service engine 106 represents any storage service related components configured or adapted to provide storage services (e.g., storage as a service) to a variety of clients using any file-based access protocols or block-based access protocols. For example, and in one embodiment, storage service engine 106 may include at least one of backup logic 121, restore logic 122, storage/cache manager 117, or storage/cache management layer 119. In one embodiment, some or all of backup module 121, restore module 122, storage/cache management layer 119, and storage/cache manager 117 are distributed in one or more processors that are associated with at least one of the deduplication logic 107, the storage units 108-109, or the cache memory device(s) 114. In other words, the storage service engine 106 can be implemented in at least one of deduplication logic 107, one or more of storage units 108-109, or one or more cache memory device(s) 114.

In one embodiment, backup logic 121 is configured to receive and back up data from a client (e.g., clients 101-102) by storing the received data in one or more of storage units 108-109, by caching the received data in cache memory device(s) 114, by updating previously stored data in any one or more of storage units 108-109, or by updating previously-cached data in cache memory device(s) 114. In one embodiment, restore logic 122 is configured to retrieve and restore data from any one or more of storage units 108-109 or cache device(s) 114 back to a client (e.g., clients 101-102). In one embodiment, one or more of clients 101-102 provides the request to backup or restore data to the backup module 121 or the restore module 122 via the network 103. In one embodiment, the request to backup or restore data includes a request to access data.

In one embodiment, storage service engine 106 includes storage/cache manager 117, which works with backup module 121 or restore module 122 to store, update, or restore data based on the request that is received from client(s) 101-102. In one embodiment, storage/cache manager 117 is executed by a processor to provide an interface to access data that is stored in at least one of storage units 108-109 or cached in cache memory device(s) 114. In one embodiment, storage/cache management layer 119 includes at least one of metadata index 118, sparse metadata segment tree (SMST)

index 123, or SMST identifier index 124, which are described in further detail below. In one embodiment, each of backup module 121, restore module 122, storage/cache management layer 119, and storage/cache manager 117 reside in memory of a processor.

In one embodiment, storage/cache manager 117 uses the storage/cache management layer 119 to access data stored in one or more storage units 108-109 or cached in one or more cache memory devices 114. In one embodiment, the storage/cache manager 117 includes a storage manager and a cache manager that each uses the storage/cache management layer 119 to access data within the storage units 108-109 and the cache memory device(s) 114, respectively.

In one embodiment, the storage/cache management layer 119 includes a metadata index 118 that is used to make stored or cached data (e.g., data objects 113-115) accessible via an index that maps metadata 110-112 to the stored or cached data (e.g., data objects 113-115).

In one embodiment, in response to receiving a request to access stored or cached data (e.g., data objects 113-115) within storage unit(s) 108-109 or cache device(s) 114, the storage/cache manager 117 accesses the metadata index 118 to determine whether the requested data object is cached in cache device (s) 114 or stored in storage unit(s) 108-109. In one embodiment, the request includes the metadata information of the requested data object. In one embodiment, the request to access stored or cached data is received from one or more clients 101-102 via network 103. For example, and in one embodiment, one or more of client 101-102 requests access to a data object that may be stored in one or more of storage units 108-109 or cached in cache device(s) 114. In this example, and in one embodiment, in response to the storage/cache manager 117 receiving the request, the storage/cache manager 117 performs a lookup of the metadata information of the requested data object within the metadata index 118 to determine whether any of metadata information 110-112 corresponds to the metadata information of the requested data object. In this example, and in one embodiment, the metadata index 118 stores a copy of metadata information 110-112, which includes location information for data objects in storage unit(s) 108-109 and cache device(s) 114. In this example, and in one embodiment, if the metadata information of the requested data object corresponds to metadata information 110-112 within storage unit(s) 108-109 or cache device(s) 114, then storage/cache manager 117 uses the location information within the metadata information 110-112 to locate the requested data object 115 and provide access to the requested data object 115. In this first example, and in one embodiment, the accessed data is updated or restored. In this first example, and in one embodiment, if the metadata information of the requested data object does not correspond to metadata information 110-112, then storage/cache memory 117 returns an error message to the one or more clients 101-102 that requested access to the data object.

In one embodiment, the storage/cache manager 117 is configured to manage storage resources of storage system 104, such as, for example, storage space and processing resources (e.g., processor, memory, network resources). The storage/cache manager 117 may be accessed by an administrator of management console or server 160 remotely via a management or configuration interface (not shown). The administrator can provision and manage storage resources based on a set of policies, rules, and/or service level agreements. The storage resources may be virtualized into a pool of virtual storage resources, where underlying physical storage resources represented by the corresponding virtual storage resources may be implemented locally, remotely (e.g., hosted by another storage system), or both. The virtual storage resources can be provisioned, allocated, and/or defined by an administrator or automatically by the storage manager based on a set of software-defined policies. The virtual storage resources may be represented in one or more virtual machines (e.g., virtual storage systems) managed by one or more virtual machine managers (VMMs). Each of the virtual machines can be provisioned to provide a particular type of storage services (e.g., file-based, block-based, object-based, or HDFS) to a client (e.g., client(s) 108-109) based on a storage policy or service level agreement associated with that particular client as part of software-defined storage services.

Note that some or all of the components as shown and described above (e.g., storage service engine 106 and/or deduplication logic 107 of FIG. 1) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

In at least one embodiment of storage system 100, files from any one of clients 101-102 are backed up by creating a full backup of the files as data objects 113-115 on at least one of storage units 108-109 or cache device(S) 114 (e.g., disks, SSDs, Random Access Memory (RAM), etc.) of the storage system 104 and making subsequent periodic full backups of the files thereafter. In one embodiment, and as explained above, each file of the backed up data represented by data objects 113-115 is processed into multiple data segments by deduplication logic 107 and subsequently stored in storage unit(s) 108-109 or cached in cache device(s) 114 in this segment form. In addition, and in one embodiment, the metadata information 110-112 corresponding to the files are processed by deduplication logic 107 into multiple metadata segments that point to the data segments. In one embodiment, the metadata segments are processed, together with the data segments, to generate a hierarchical tree data structure—for example, a Merkle tree with multiple layers. In one embodiment, the hierarchical tree data structure includes several layers that represent the metadata information 110-112 associated with the stored or cached data 113-115, as well as, the stored or cached data 113-115. In one embodiment, the hierarchical tree data structure is stored as part of metadata information 110-112 within at least one of metadata index 118, one or more storage units 108-109, or cache memory device(s) 114. In one embodiment, the hierarchical tree data structure is used, by storage service engine 106, for accessing or storing the data segments created by deduplication logic 107, which represent data objects 113-115. In one embodiment, the storage service engine 106 uses the hierarchical tree data structure to fulfil access requests for backing up or restoring client data from or to one or more clients 101-102. The hierarchical tree data structure generated by the deduplication logic 107 is based on a full backup and is referred to throughout this specification as a base segment tree.

Figure 2:
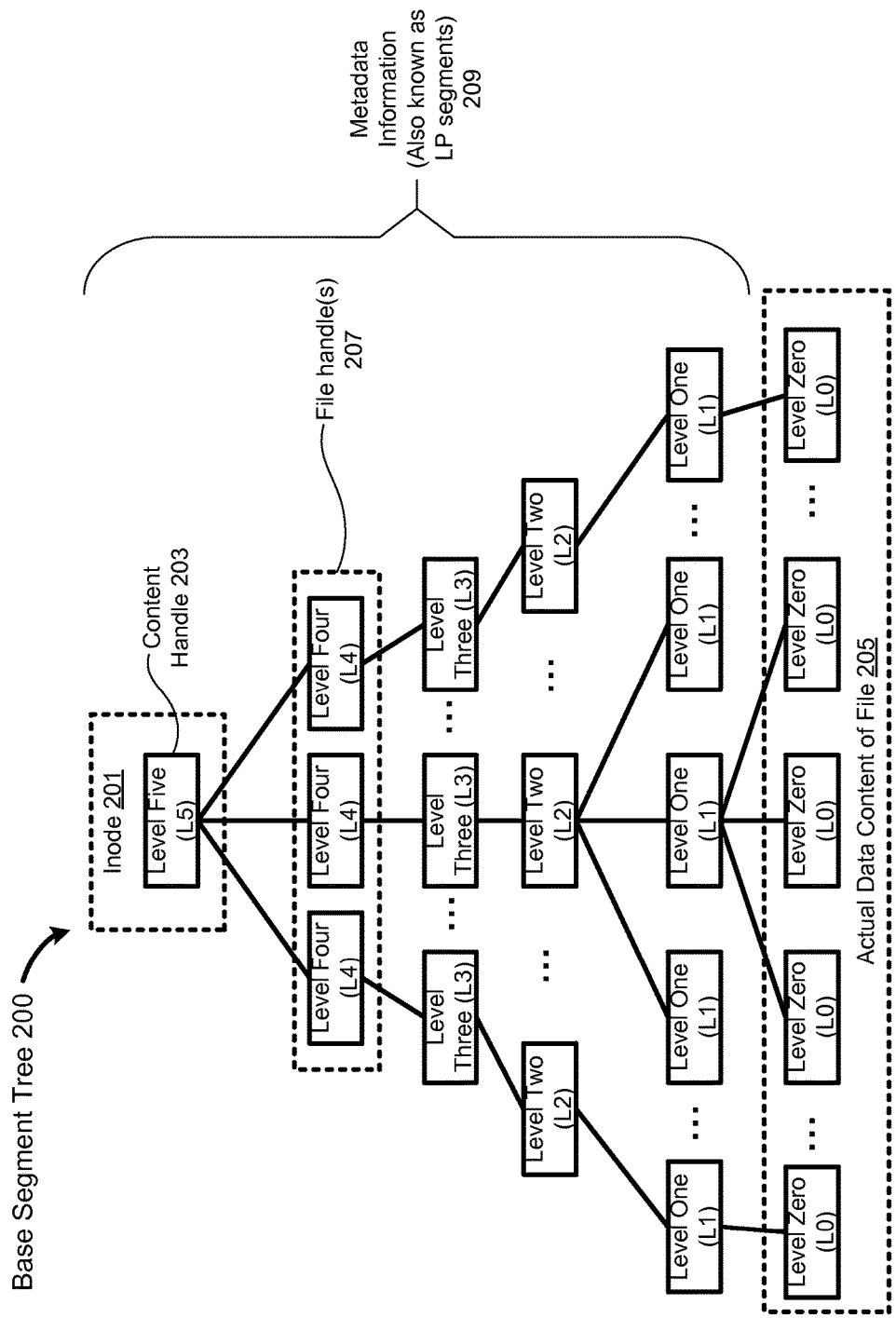
FIG. 2 illustrates an exemplary base segment tree according to one embodiment of the invention.

Referring briefly to FIG. 2, which illustrates an exemplary base segment tree 200 according to one embodiment of the invention. In one embodiment, the base segment tree 200 is a hierarchical tree data structure, as described above. In one embodiment, the base segment tree 200 is a Merkle tree of segments having multiple layers, as described above. For example, and in one embodiment, base segment tree 200 has six layers: L0, L1, L2, L3, L4, and L5. It is to be appreciated that base segment tree 200 can have more or less than six layers in some embodiments.

In one embodiment, each parent layer of the base segment tree 200 spans 512 children. In one embodiment, each parent layer of the base segment tree 200 references a corresponding child by the fingerprint of the child segment. In one embodiment, each node of the base segment tree 200 spans a fixed or variable sized amount of data. For example, and in one embodiment, the L1 covers approximately four megabytes of data. In one embodiment, a specific offset that is part of the file represented by the base segment tree 200 is used to locate specified data of the file. In this embodiment, the base segment tree 200 is traversed based on the node size covered to the leaf node for that offset. In one embodiment, the L0 segments represent the actual data content 205 (also known as data segments, data chunks, segmented chunks, or chunks) of the file represented by the base segment tree 200. As shown in FIG. 2, the data segments represented by L0 are the leaves of the base segment tree 200. In one embodiment, the L4 segments include a file handle used for identifying content 205 of the file represented by the base segment tree 200. In one embodiment, the file of the stored or cached data (e.g., data objects 113-115 of FIG. 1) that is abstracted into the base segment tree 200 includes a content handle (CH) 203 that is stored in an inode 201. In one embodiment, the CH 203 represents an identifier for the file that is abstracted into the base segment tree 200. As illustrated in FIG. 2, the inode 201 includes the CH 203, which is the root of the base segment tree 200. In one embodiment, the inode 201 is created by deduplication logic 107 and may be created/updated every time the data contents 205 represented by L0 changes. In one embodiment, the segments from L1 to L5 represent the metadata segments or LP segments of the base segment tree 200. The "L" in LP refers to the level of the tree, and the "P" is 5 for the root of the tree, 4 for the nodes below the root node, and so on. In one embodiment, these LP segments represent the metadata information of the file that is abstracted into the base segment tree 200. In one embodiment, these LP segments are used to point to the data segments 205 represented by the L0 segments. An L1 segment is an array of L0 references. Similarly, an L2 is an array of L1 references and so on.

With regard again to FIG. 1, in one embodiment, a file system (not shown) packs the created data and metadata segments into containers that are written to one or more of storage units 108-109 or one or more of cache 114 in a log-structured manner. Each container is structured into sections. In one embodiment, at least one of the sections of the container is the metadata section that contains all the references or fingerprints that identify the segments in the container.

In one embodiment, a metadata segment (e.g., one of L1-L5 segments of FIG. 2) of a base segment tree is used in a pointing technique to reference or point to a large portion of data segments (e.g. L0 segments) or a large portion of other metadata segments (e.g., one of L1-L5 segments of FIG. 2). The following three examples illustrate some ways of using a metadata segment (e.g., one of L1-L5 segments of FIG. 2) of a base segment tree to reference or point to a large portion of data segments (e.g. L0 segments) or a large portion of other metadata segments (e.g., one of L1-L5 segments of FIG. 2).

In a first example, when a request to read a data segment of a file that has been abstracted into a base segment tree data (e.g., the base segment tree 200 of FIG. 2) is received by the storage system 104, then the storage service engine 106 reads a path that is made up of a plurality of metadata segments (e.g., L1-L5 segments of FIG. 2) in order to access the actual content of the file (e.g., an L0 segment of FIG. 2). In this first example, a particular one of the metadata segments (e.g., a particular L1 segment of FIG. 2) may provide a path to two different data segments (e.g., two different L0 segments of FIG. 2). Each time either of the two data segments referenced by the particular metadata segment (e.g., the particular L1 segment of FIG. 2) is read, the particular metadata segment must also be read to enable access to the actual content within the data segments.

In a second example, when a request to update or overwrite a data segment of a file that has been abstracted into a base segment tree data (e.g., the base segment tree 200 of FIG. 2) is received by the storage system 104, then the storage service engine 106 must read a path that is made up of a plurality of metadata segments (e.g., L1-L5 segments of FIG. 2) in order to access the actual content of the file (e.g., an L0 segment of FIG. 2) and subsequently modify or overwrite the actual content. Similar to the first example, in this second example, a particular one of the metadata segments (e.g., a particular L1 segment of FIG. 2) may provide a path to two different data segments (e.g., two different L0 segments of FIG. 2). Each time either of the two data segments referenced by the particular metadata segment (e.g., the particular L1 segment of FIG. 2) is overwritten (also referred to as updated), then the particular metadata segment must also be overwritten or updated to enable future access to the actual content within the updated data segment.

In a third example, when a request to update (also referred to as overwrite) a data segment of a file that has been abstracted into a base segment tree data (e.g., the base segment tree 200 of FIG. 2) is received by the storage system 104, then the storage service engine 106 must read a path that is made up of a plurality of metadata segments (e.g., L1-L5 segments of FIG. 2) in order to access the actual content of the file (e.g., an L0 segment of FIG. 2) and subsequently modify or overwrite the actual content. In this third example, when the request to update the actual content of the file (e.g., an L0 segment of FIG. 2) is received, a data stream is opened to enable the transfer of data to or from the storage system 104. In this third example, when the data stream is opened, one or more of cache devices 114 are reserved for caching metadata segments associated with the request to update the actual content of the file. These reserved cache device(s) 114 are referred to as a stream cache. In this third example, in response to the data stream being opened, the modifications to the actual content of the file (e.g., an L0 segment of FIG. 2) are cached in the stream cache as a replica of the base segment tree that is more updated than the base segment tree residing in storage unit(s) 108-109. In this third example, a copy of the original base segment tree residing in storage unit(s) 108-109 is also cached in the stream cache. In this third example, the modification of the base segment tree residing in storage unit(s) 108-109 is not performed until a read request is received after the replica base segment tree and the copy of the original base segment tree are cached in the stream cache. In this third example, in response to the request to read the actual content of the file (e.g., an L0 segment of FIG. 2), the replica base segment tree residing in the stream cache is merged with the copy of the original base segment tree residing in the stream cache. Thus, the path that is made up of a plurality of metadata segments (e.g., L1-L5 segments of FIG. 2) for accessing the actual content is updated to reference the modified content. In this third example, the read request is fulfilled using the newly created base segment tree residing in the stream cache. In this third example, the newly created base segment tree, the replica base segment tree, and the copy of the original base segment tree all reside in the stream cache. When the stream cache reaches its quota, the metadata segments of these three base segment trees are evicted beginning with the copy of the original base segment tree, then the replica base segment tree, and finally the newly created base segment tree. Note that the newly created base segment tree is not stored in storage unit(s) 108-109 until the open data stream is closed (e.g., a file is closed). In this third example, the inode including the content handle of the newly created base segment tree (i.e., the root of the newly created base segment tree) is generated after the newly created base segment tree is stored in storage unit(s) 108-109. The metadata segments that are evicted from the stream cache are maintained in another set of one or more cache devices 114 referred to as a shared metadata cache. In the shared metadata cache, the metadata segments are referenced by their fingerprints, which are described above. The scenario described above in the third example is a random write process that includes a stream cache and a shared metadata cache. Similar to the first and second examples, in this third example, a particular one of the metadata segments (e.g., a particular L1 segment of FIG. 2) may provide a path to two different data segments (e.g., two different L0 segments of FIG. 2). Each time either of the two data segments referenced by the particular metadata segment (e.g., the particular L1 segment of FIG. 2) is overwritten (also referred to as updated), then the particular metadata segment must also be overwritten or updated to enable future access to the actual content within the updated data segment.

In the three examples described above, the pointing technique includes using a plurality of metadata segments (e.g., L1-L5 segments of FIG. 2) from each level of the base segment tree to point to a single data segment at L0 of the base segment tree in order to read, modify, or overwrite the content of the referenced data segment. In some situations, each one of the plurality of metadata segments (e.g., L1-L5 segments of FIG. 2) references a large amount of other metadata segments or data chunks. This enables a single metadata segment to be used in multiple paths to different data chunks. One advantage of the pointing technique described above is minimization of overhead associated with storing metadata information that corresponds to stored or cached data in a storage system (e.g., storage system 104 of FIG. 1). For example, this pointing technique enables storage size of the metadata segments (e.g., L1-L5 segments of FIG. 2) to amount to less than 0.05% of total backup's storage size (e.g., L0 segments of FIG. 2). This pointing technique, however, is not ideal for all types of backups. One type of backup that is not ideal for the pointing technique described above is an incremental backup. Incremental backups provide a backup of files that have changed or are new since the last full back or the last incremental backup. In this type of backup, the only data that is stored is data that has changed since the last backup (whether that last backup is an incremental backup or full backup). There are variations of the incremental backup and they include, but are not limited to, multilevel incremental backups, reverse incremental backups, incremental forever backup, block level incremental backups, and byte level incremental backup.

An incremental backup and its variations are beneficial because changes to a full backup are typically low, whether that full backup is an initial full backup or a subsequent full backup. For example, and in one embodiment, when the data that has changed since an initial full backup is less than 1% of the total backup size, then the amount of storage space for storing or caching this changed portion within storage unit(s) 108-109 or cache device(s) 114 is low. In the preceding example, the changed portion may be stored with or without the initial full backup. This makes incremental backups much smaller and quicker than full backups. Nevertheless, as each incremental backup is stored on the storage system 104, a full copy needs to be represented on the storage system 104 in the event that a full restoration of data is needed.

When the pointing technique described above is implemented by the storage system 104 of FIG. 1 to access or write updates to backed up files, the overhead of updating and storing metadata segments (e.g., one of L1-L5 segments of FIG. 2) can be extremely expensive. This is because each time a small piece of data within the last full backup data is updated, the entire path of metadata segments in the hierarchical tree data structure must also be updated. Stated differently, if a single metadata segment points to multiple data segments, every small change to any one of these multiple data segments would require the single metadata segment to be updated and/or overwritten. Given that this single metadata segment can be part of multiple paths (made up of a plurality of metadata segments) that are used to read, modify, or overwrite multiple data segments. This single metadata segment can, in some situations, be in a perpetual state of being updated and/or overwritten. This continual state can have negative effects on the lifecycle of the storage unit(s) 108-109 or cache device(s) 114 storing or caching the single metadata segment because this continual state can lead to increases in metadata churn and a shorter life span of storage unit(s) 108-109 or cache device(s) 114. As shown in the third example described above, one consequence of the random write process that includes a stream cache and a shared metadata cache is that the stream cache or the shared metadata cache is subjected to high metadata churn as at least three different base segment trees are perpetually written to and erased from these cache device.

Moreover, the pointing technique described above can limit the lifecycle of certain non-volatile memory devices (including, but not limited to, SSDs), which are known to have a limited number of write-erase cycles after which a given region of the memory device cannot be rewritten. If the pointing technique described above is implemented with storage unit(s) 108-109 or cache device(s) 114 that include such a non-volatile memory device, the continual state of updating the metadata segments due to small changes in the data segments can lead to an inefficient use of such non-volatile memory devices. For example, incremental forever backups include backups that are implemented on logical unit numbers (LUNs) or virtual machines (VMs) using Change Block Tracking (CBT) technology or virtual synthetic backup technology can suffer from this problem. In these incremental forever backups, if a single metadata segment is used to point to multiple data segments, updating the single metadata segment to reflect the changes of one or more incremental backups can be as expensive as the updating the data itself. This is because the non-volatile memory devices are used up quickly due to high metadata churn. Hence, the pointing technique described above is not optimally efficient in updating and storing metadata segments for some types of backups.

In one embodiment, the storage system 104 is designed to assist with reducing some of the negative effects caused by the pointing technique described above. In one embodiment, each incremental backup that is performed after a full backup has been performed by the storage system 104 is represented using one or more sparse metadata segment trees (SMSTs). The one or more SMSTs assist with improving the efficiency of accessing, storing, updating, or restoring of files within the storage system 104.

As used herein, an SMST is a hierarchical tree data structure that corresponds to the base segment tree and includes updates or modifications to the base segment tree. In one embodiment, there are three types of SMSTs—(i) an incremental SMST; (ii) a master SMST; and (iii) a grandmaster SMST. In one embodiment, an incremental SMST is a hierarchical tree data structure that includes updates or modifications to a single data segment (or L0 segment) of a base segment tree. In one embodiment, two or more incremental SMSTs can be merged together to form a master SMST made up of the information of the multiple incremental SMSTs. In one embodiment, two or more master SMSTs can be merged together to form a grandmaster SMST made up of the information of the multiple master SMSTs. In one embodiment, the different types of SMSTs can be merged with each other. Moreover, in one embodiment, each type of SMST can be merged with its corresponding original base segment tree to form an updated base segment tree. The updated base segment tree includes all of the data segments and metadata segments of the SMST and the original base segment tree.

In one embodiment, the SMST is a Merkle tree including multiple layers. In one embodiment, the deduplication logic 107 generates the SMST. In one embodiment, the SMST includes several layers that correspond to the layers of the base segment tree. In one embodiment, the corresponding layers (including the segments) of the SMST and the base segment tree are linked using a unique identification. In one embodiment, the SMST stores only the data or the metadata that has changed since the last backup, whether that backup is a full backup or an incremental backup. In one embodiment, an SMST includes metadata segments that correspond to and are linked to metadata segments of a base segment tree. In one embodiment, a metadata segment of an SMST is represented as a data structure that includes a header with a valid bitmap for each of the other metadata segments or data segments that can be referenced by that specific metadata segment. In one embodiment, a metadata segment of an SMST is represented as a data structure that includes an identifier in a form of a file handle (e.g., file handle 207 of FIG. 2) and an offset identifying a metadata segment or a data segment that is used as an anchor. Additional details about the data structure that includes a header and the data structure that includes the file handle and the offset are described below in connection with the description of FIGS. 9A-B.

Figure 3:
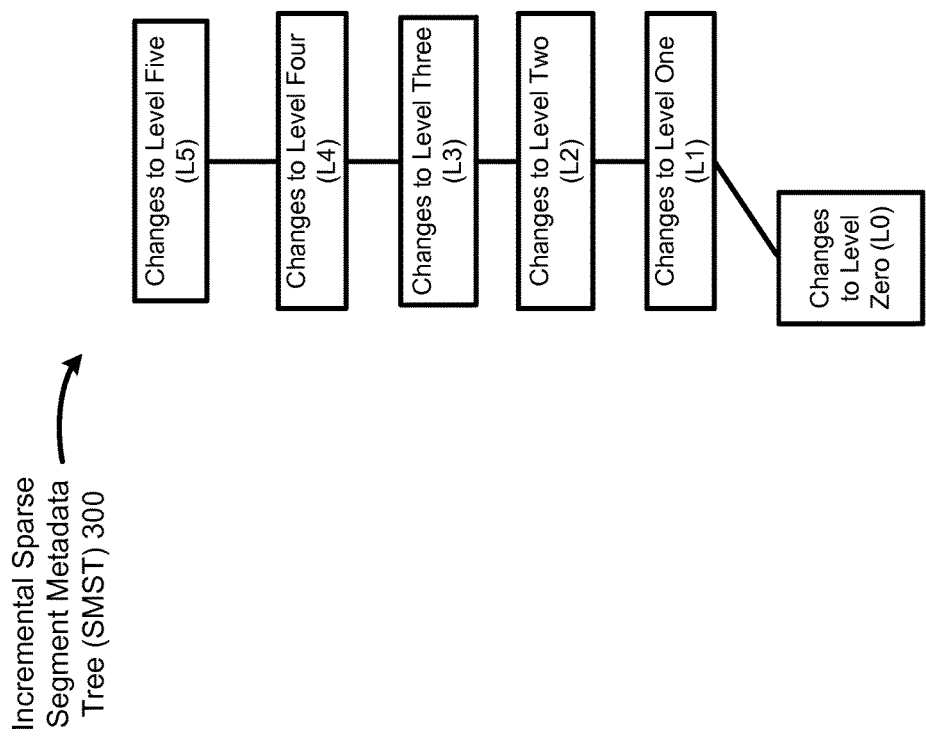
FIG. 3 illustrates an exemplary sparse segment metadata tree (SMST) according to one embodiment of the invention.

Referring briefly to FIG. 3, which illustrates an exemplary incremental SMST 300 according to one embodiment of the invention. For the sake of clarity, the incremental SMST 300 is described in connection with the base segment tree 200 of FIG. 200, whose corresponding description is set forth above. In one embodiment, the incremental SMST 300 is generated after the last backup of the file that is represented by the base segment tree 200 of FIG. 200. In one embodiment, when one of the data segments represented by the L0 layers of the base segment tree 200 of FIG. 200 needs to be updated, these incremental changes are represented in the incremental SMST 300 instead of the base segment tree 200. In this way, the incremental SMST 300 captures updates to (i) a single data segment of the base segment tree 200; and (ii) the plurality of metadata segments of the base segment tree 200 that are used to read or access the single data segment. One advantage of the incremental SMST 300 is that the entire base segment tree 200 is not updated immediately to reflect the changes to the single data segment. The incremental SMST 300 enables the storage system 104 to avoid updating the entire base segment tree 200 just to reflect the updates to a single L0 segment. In one embodiment, each time an L0 segment of the base segment tree 200 is to be updated, a separate incremental SMST that is similar to the incremental SMST 300 is generated to reflect the updates to the corresponding L0 segment.

Returning to FIG. 1, in one embodiment, after the deduplication logic 107 generates an SMST to capture updates to one or more L0 segments of the base segment tree, the deduplication logic also generates one or more unique identifiers linking the segments of the SMST to the corresponding segments of the base segment tree. In one embodiment, boundaries of the metadata and data segments of the generated SMST whose L0 data segment includes an update to a corresponding L0 data segment of the base segment tree are aligned with corresponding boundaries of the metadata and data segments of the corresponding base segment tree base. In one embodiment, the generated SMST is stored or cached as part of at least one of metadata information 110-112 or the SMST index 123. In one embodiment, the generated unique identifiers linking the SMST to the base segment tree are stored or cached as part of at least one of metadata information 110-112 or the SMST identifier index 124. In one embodiment, the SMST is stored or cached in a storage unit 108-109 or a cache device 114 that is reserved exclusively for storing or caching SMSTs. In this way, the other ones of storage units 108-109 or cache devices 114 are not subject to excessive write-erase cycles, which can prolong the lifecycles of some of the storage units 108-109 or cache devices 114. In one embodiment, the SMST is stored in the same storage unit(s) 108-109 or cache device(s) 114 that store the SMST's corresponding base segment tree. Given that the storage space occupied by the SMST is low and the writes to the storage unit(s) 108-109 or cache device(s) 114 are low latency, the updates represented by the SMST can be stored and accessed in a more efficient manner when compared with the pointing technique described above.

Figure 4:
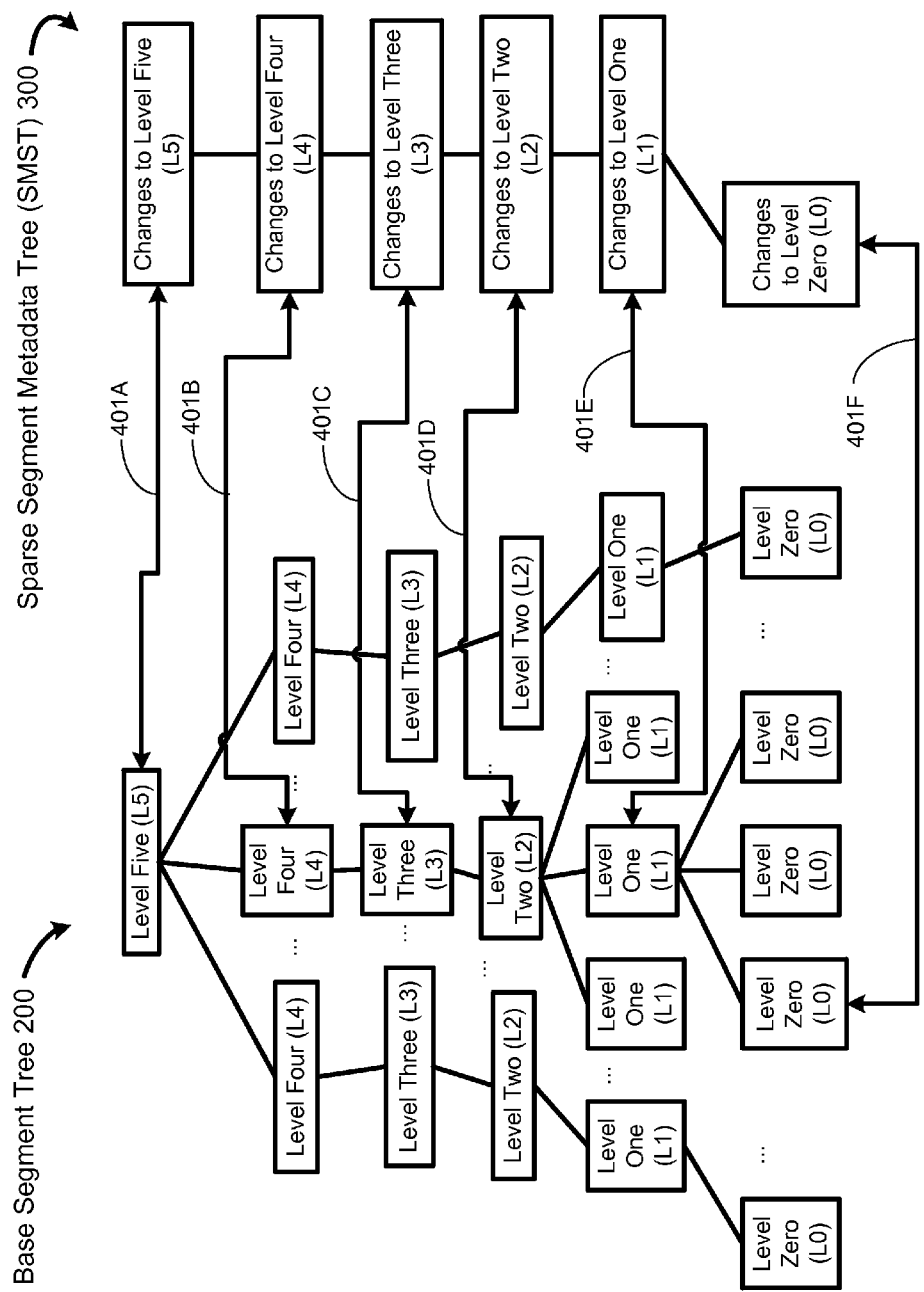
FIG. 4 illustrates the exemplary base segment tree of FIG. 2 and the exemplary SMST of FIG. 3 linked together using unique identifiers according to one embodiment of the invention.

Referring briefly to FIG. 4, which illustrates the exemplary base segment tree 200 of FIG. 2 and the exemplary incremental SMST 300 of FIG. 3 linked together using unique identifiers 401A-F according to one embodiment of the invention. As shown in FIG. 4, the unique identifiers 401A-F generated by the deduplication logic 107 of FIG. 1 are used to indicate which levels of the base segment tree 200 are affected by the updates or changes represented in the incremental SMST 300. In one embodiment, the unique identifiers are any identifiers that are guaranteed to be unique among all identifiers used for corresponding levels of a base segment tree with levels of an SMST. In one embodiment, the unique identifiers can be serial numbers, random numbers, or other identifiers based on known unique identification techniques.

With regard again to FIG. 1, one benefit provided by SMSTs is that the metadata segments and data segments represented in the base segment tree do not have to updated immediately. This delay in the updating of a base segment tree can reduce the number of input/output operations per second (IOPS) used for at least one of a read-erase-modify-write process needed for randomly written data, a read-modify-write process, or a read-write process that the storage unit(s) 108-109 or the cache device(s) 114 are subjected to. A reduction of the TOPS can have a positive effect of prolonging the lifecycle of storage unit(s) 108-109 or cache device(s) 114. In one embodiment, at least one of the cache devices 114 is used exclusively for storing the SMSTs, while one or more of the storage units 108-109 or the other cache devices 114 are used for storing the base segment tree. In this way, less than all of the memory devices 114 or the unit(s) 108-109 are subjected to a higher number of input/output operations per second (IOPS) due to at least one of a read-erase-modify-write process needed for randomly written data, a read-modify-write process, or a read-write process that the device(s) 114 or the unit(s) 108-109 are subjected to. Thus, the life spans of the other cache device(s) 114 or the storage unit(s) 108-109 that do not store the SMST can be prolonged.

In one embodiment of system 100 of FIG. 1, a request to read a data segment of a file that has been abstracted into an original base segment tree and that also has a corresponding SMST includes issuing a load of the metadata segments (e.g., a L1 ... LN metadata segments) of the base segment tree and the SMST in an asynchronous fashion. In one embodiment, in response to the request, a data stream is opened to enable the transfer of data to or from the storage system 104. In one embodiment, in response to the data stream being opened, an updated base segment tree is formed by merging the L0 data segment of the original base segment tree with the corresponding L0 data segment of the SMST. In one embodiment, the creation of the updated base segment tree includes caching the original base segment tree and the corresponding SMST in at least one of storage unit(s) 108-109 or the cache device(s) 114. In one embodiment, the metadata segments (e.g., a L1 ... LN metadata segments) of the original base segment tree are loaded as cached data to determine the location of the L0 data segment of the original base segment tree. In one embodiment, in response to the load being completed, the cached metadata segments of the original base segment tree are merged with the corresponding cached metadata segments of the SMST. In one embodiment, in response to the merger, the original base segment tree and the corresponding SMST that were cached in at least one of storage unit(s) 108-109 or the cache device(s) 114 are evicted from the cache. In one embodiment, during the eviction of the cached base segment tree and the cached SMST, an updated SMST that includes metadata segments (e.g., a L1 ... LN metadata segments) of the original base segment tree and the data segment (L0 data segment) of the updated base segment tree is formed in the cache. In one embodiment, the updated SMST is cached in at least one of storage unit(s) 108-109 or the cache device(s) 114. In this way, the SMSTs can be used to improve storage efficiency, access, backup, and restoration. In one embodiment, the eviction of the cached base segment tree and the cached SMST that were cached in at least one of storage unit(s) 108-109 or the cache device(s) 114 is performed in response to a cache quota of the cache being reached or in response to the data stream being closed.

In one embodiment of system 100 of FIG. 1, when one or more metadata segments of an SMST are to be read in response to a request from one or more clients 101-102, then the one or more metadata segments of the SMST are read from a cache made up of at least one of storage unit(s) 108-109 or the cache device(s) 114. In one embodiment, when the one or more metadata segments of the SMST do not include all of the data required to fulfill a read request (e.g., an identifier in a form of a file handle (e.g., file handle 207 of FIG. 2) and an offset identifying a metadata segment or a data segment of the file being read), then a base segment tree corresponding to the SMST is read from at least one of storage unit(s) 108-109 or the cache device(s) 114 and merged with the SMST to fulfill the read request. In one embodiment, the base segment tree is cached in at least one of storage unit(s) 108-109 or the cache device(s) 114. In one embodiment, at least one of the SMST or its corresponding base segment tree is persistently stored in storage unit(s) 108-109. In one embodiment, if the original lookup for the SMST or its corresponding base segment tree cannot be completed using the cache that is made up of at least one of storage unit(s) 108-109 or the cache device(s) 114, then a second lookup is performed to determine whether the SMST or its corresponding base segment tree can be read from the storage unit(s) 108-109. In one embodiment, all original base segment trees and SMSTs that are persistently stored on storage unit(s) 108-109 at the same time are merged to form an updated base segment tree.

As explained above, in one embodiment, boundaries of the metadata and data segments of an SMST whose L0 data segment includes an update to a corresponding L0 data segment of the base segment tree are aligned with corresponding boundaries of the metadata and data segments of the corresponding base segment tree. In one embodiment, this alignment enables the updates represented by the SMST to include a metadata segment that is a content handle or CH (e.g., CH 203 of FIG. 2). In one embodiment, this alignment enables the CH of the SMST to represent only the modification represented by the SMST, i.e., the CH of the SMST includes only the updates to the CH of the corresponding base segment tree. In one embodiment, the CH of the SMST can be used to avoid reading a path of a plurality of metadata segments of a base segment tree whenever the data segment (L0) of the base segment tree needs to updated. In one embodiment, in response to a request to update a data segment of a file, an SMST including the updates is generated by the storage system 104. In one embodiment, following the generation of the SMST, the CH of the SMST including the updates (also referred to as a delta-CH) is linked, using a unique identifier, to the CH of its corresponding base segment tree. In one embodiment, when a second request to update the base segment tree is made, a second SMST including the second updates is generated and the CH of the SMST is linked to the CH of the base segment tree using a unique identifier. In this way, the base segment tree is not read when updates or overwrites are made to the data segments of the base segment tree. In one embodiment, for each $N^{th}$ request (where N=1 ... ∞) to update a data segment of a base segment tree, a separate SMST is generated to encompass the updates of that specific request and a CH of the SMST is linked to the base segment tree using a unique identifier. This can assist with reducing the number of times that storage unit(s) 108-109 or cache device(s) 114 are subjected to at least one of a read-erase-modify-write process needed for randomly written data, a read-modify-write process, or a read-write process. A reduction in the number of these processes can prolong the lifecycles of unit(s) 108-109 or device(s) 114. In one embodiment, the generation of separate SMSTs and the linking of the CHs of these SMSTs to a corresponding base segment tree can assist with reducing metadata churn. This is because update requests will be proportional to a rate of change of the actual data and not to the distribution of the changes.

A synthetic backup is identical to a regular full backup in terms of data, but it is created when data is collected from a previous, older full backup and assembled with subsequent incremental backups. The incremental backup will consist only of changed information. In one embodiment, for synthetic backups, only the data segments of the SMSTs need to be replicated when data segments of the base segment tree are stored or cached in at least one of storage unit(s) 108-109 or cache device(s) 114. In one embodiment, when a full restoration of a full backup is required, then the SMSTs and the corresponding base segment tree are merged to form an updated base segment tree that represents all of the data segments to be restored.

There are many different storage architectures that can be used in storage system 104 for caching or storing the SMSTs and the corresponding base segment tree. In one embodiment, only the SMSTs are cached in at least one of storage unit(s) 108-109 or cache device(s) 114, while the base segment tree is persistently stored in storage unit(s) 108-109. In one embodiment, the SMSTs and the corresponding base segment tree are cached in at least one of storage unit(s) 108-109 or cache device(s) 114, and the base segment tree is persistently stored in storage unit(s) 108-109. In one embodiment, the SMSTs and the corresponding base segment trees are cached in at least one of storage unit(s) 108-109 or cache device(s) 114, and the SMSTs and the corresponding base segment trees are persistently stored in storage unit(s) 108-109. Additional details about different storage architectures that include the SMSTs and the corresponding base segment trees are described below in connection with at least one of FIG. 5, 6, 7, or 8. One advantage of the storage architectures described herein is that any requests to read data are fulfilled using an on-demand merge of the SMSTs with each other or an on-demand merge of the SMSTs with the base segment tree. This can assist with controlling the lifecycle of storage unit(s) 108-109 or cache device(s) 114. In one embodiment, when SMSTs are evicted from a cache that is formed from at least one of storage unit(s) 108-109 or cache device(s) 114, then the evicted SMSTs are merged with the base segment tree and persistently stored in storage unit(s) 108-109.

Figure 5:
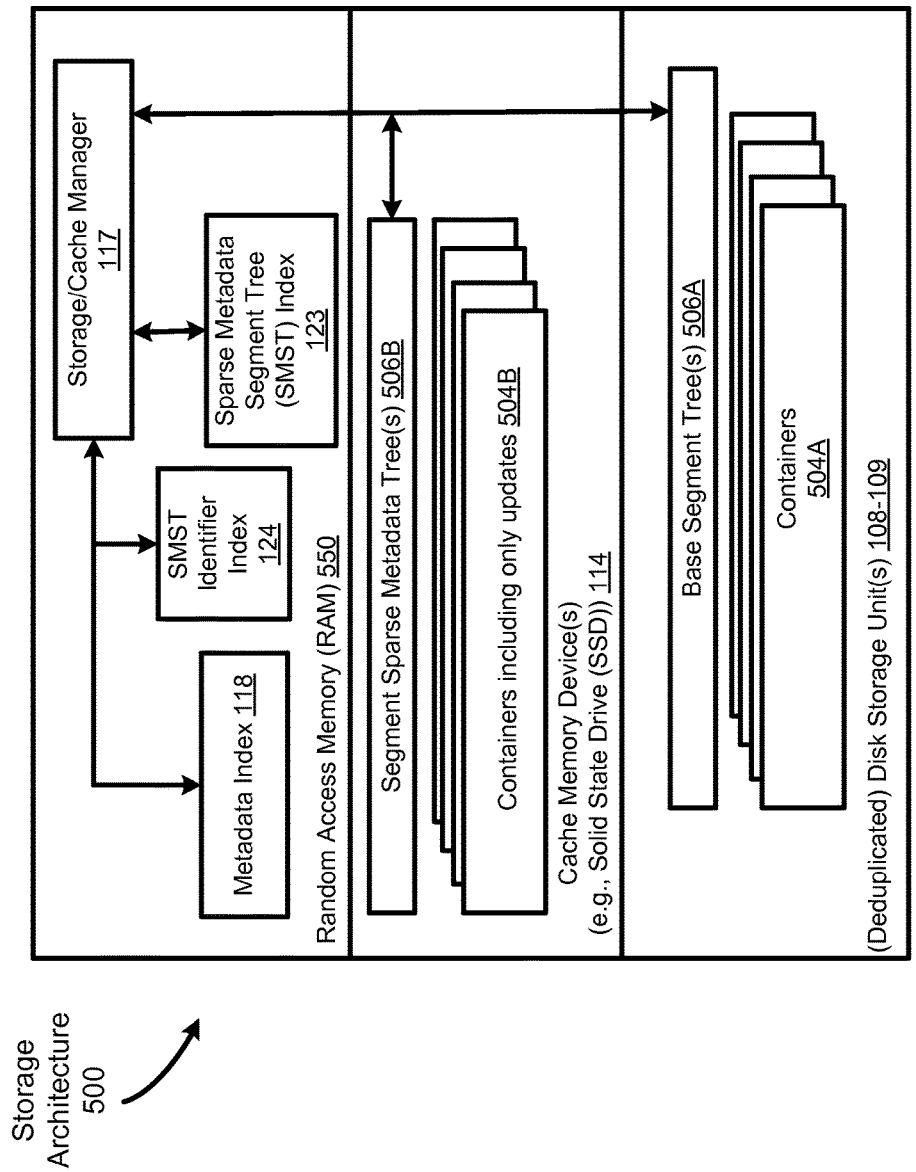
FIG. 5 illustrates a three-layer storage architecture that includes one or more SMSTs according to one embodiment of the invention.

FIG. 5 illustrates storage architecture 500 of a storage system according to one embodiment of the invention. In one embodiment, the storage architecture 500 is part of the storage system 120 described above in connection with FIG. 1. In one embodiment, the storage architecture 500 performs some of the processes or functionalities described above in connection with at least one of FIG. 1, 2, 3, or 4. In one embodiment, the storage architecture 500 is made up of multiple levels. In the illustrated embodiment of the storage architecture 500, there are three levels—(i) a first level made up of disk storage unit(s) 108-109; (ii) a second level made up of cache memory device(s) 114, and (iii) a third level made up of Random Access Memory (RAM) 550. In one embodiment, storage architecture 500 has more than three levels. In one embodiment, storage architecture 500 has less than three levels.

The first level of storage architecture includes disk storage unit(s) 108-109, which may be implemented using hard drives for large capacity. In one embodiment, disk storage unit(s) 108-109 are similar to or the same as the disk storage unit(s) 108-109 described above in connection with FIG. 1. Disk storage unit(s) 108-109 may be deduplicated in one embodiment. In one embodiment, disk storage unit(s) 108-109 include container(s) 504A to store data files, which contain segmented chunks after deduplication. In one embodiment, disk storage unit(s) 108-109 also contain one or more base segment trees 506A. In one embodiment, each base segment tree 506A is a hierarchical tree structure (e.g., a Merkle tree) that is used as a file recipe to provide access to data within corresponding containers 504A in which the bottom level (L0) is the data, the first level (L1) contains the fingerprints of consecutive regions of data (grouped into segments) and the upper levels (L2 . . . LN) are fingerprints of the segments of the level below. In one embodiment, each base segment tree 506A is a base segment tree, as described above in FIG. 1.

The second level of the storage architecture 500 includes cache memory device(s) 114. Cache device(s) 114 can include, but are not limited to, an SSD, a flash-based memory device, or other known flash memory. In one embodiment, cache device(s) 114 are included in the storage architecture 500 to assist with accelerating performance and efficiency of accessing data stored in storage architecture 500 for updating, backing up, or restoring the data based on requests from one or more clients (not shown). In one embodiment, the cache device(s) 114 include container(s) 504B, which store updates to data stored within container(s) 504A. In one embodiment, the container(s) 504B are similar to the container(s) 504A and contain segmented chunks after deduplication. In one embodiment, cache device(s) 114 also contain at least one SMST 506B. In one embodiment, each SMST 506B is a hierarchical tree structure (e.g., a Merkle tree) that is used as a file recipe to provide access to data within corresponding containers 504B in which the bottom level (L0) is the incremental data to be used for updating the data stored within container(s) 504A, the first level (L1) contains the fingerprints of consecutive regions of incremental data (grouped into segments) and the upper levels (L2 . . . LN) are fingerprints of the segments of the level below. In one embodiment, each SMST 506B is an SMST, as described above in FIG. 1. In one embodiment, the SMSTs can include at least one of an incremental SMST, a master SMST, or a grandmaster SMST, as described above in FIG. 1.

The third layer is random access memory (RAM) 220, which may be part of system memory of a storage system such as storage system 104 of FIG. 1. RAM 220 may be dynamic RAM (DRAM) or non-volatile RAM (NVRAM) or a combination thereof in one embodiment. RAM 220 contains storage/cache manager 117, which is similar to or the same as the storage/cache manager 117 of FIG. 1. In one embodiment, storage/cache manager 117 interacts with metadata index 118, SMST identifier index, and SMST index 123 to accelerate reading from and writing data to disk storage unit(s) 108-109. In one embodiment, storage/cache manager 117 interacts with each of metadata index 118, SMST identifier index, and SMST index 123 (which are described above in connection with FIG. 1) to read from and write to cache device(s) 114 or storage unit(s) 108-109. Note RAM 220 may contain additional modules that are not shown, e.g., a garbage collection module. Also note that storage architecture 500 of FIG. 2 may be implemented as part of the storage system 104 of FIG. 1.

In one embodiment, the cache device(s) 114 is made of a SSD, a flash memory device, or a flash-based memory device. SSDs have unique properties that must be considered (these techniques/properties also generally apply to flash memory devices and flash-based memory devices such as PCIe-based flash devices). For example, an SSD must be explicitly erased before being overwritten. In addition, writes wear out the SSD storage over time; therefore, less frequent writing is more desirable.

In one embodiment, due to the SMST(s) 506B, the cache device(s) 114 does not perform an unnecessarily large number of input/output operations per second (IOPS) due to at least one of a read-erase-modify-write process needed for randomly written data, a read-modify-write process, or a read-write process that the cache device(s) 114 is subjected to as the data of the containers 504A are updated using data from containers 504B. In one embodiment, the SMSTs 506B are merely written to the cache device(s) 114 using a read-write process that is performed within the cache device(s) 114. In this embodiment, when the storage/cache manager 117 determines that the all of the SMSTs 506B stored in device(s) 114 have reached a predetermined storage capacity of the cache memory device(s) 114, then the storage/cache manager 117 triggers the merging of the incremental SMSTs 506B into a master SMST 506B and erases all of the incremental SMSTs 506B making up the master SMST 506B. In this way, the frequency of program/erase cycles (P/E cycles) of the cache device(s) 114 can be reduced or predicted more accurately, which in turn can assist with extending the lifecycle of the cache device(s) 114. In one embodiment, after the single master SMST 506B has been created, additional individual SMSTs 506B are written to device(s) 114 until these additional individual SMSTs 506B reach a predetermined storage capacity of the cache memory device(s) 114 and are merged to form another master SMST, as described above. Thus, in one embodiment, there can be multiple master SMSTs 506B written to device(s) 114. In one embodiment, when the multiple master SMSTs 506B stored in device(s) 114 have reached a predetermined storage capacity of the cache memory device(s) 114, then the storage/cache manager 117 triggers the merging of the multiple SMSTs 506B into a single grandmaster SMST 506B and erases all of the individual master SMSTs 506B making up the grandmaster SMST 506B to free up space on the device(s) 114. In this way, the frequency of program/erase cycles (P/E cycles) of the cache device(s) 114 can be reduced, which in turn extends the lifecycle of the cache device(s) 114.

In one embodiment, the updates represented by the SMST(s) 506B are not applied to the base segment tree(s) 506A until a request to read data stored in the storage unit(s) 108-109 is received by a storage system implementing storage architecture 500. In one embodiment, the request to read data is received from one or more clients (e.g., client(s) 101-102 of FIG. 1). In one embodiment, in response to the request being received, storage/cache manager 117 determines based on metadata information within the request whether the requested data is stored in unit(s) 108-109 without determining whether the requested data is stored in cache device(s) 114. In one embodiment, the manager 117 makes this determination in accordance with the description provided above in FIG. 1. In one embodiment, the manager 117 also determines, based on the SMST identifier index 124 and the SMST index 123, whether the data stored within unit(s) 108-109 and represented by base segment tree(s) 506A has one or more corresponding SMSTs 506B that include updates to the data. In one embodiment, if the requested data needs to be updated before being provided back to the requesting client, then the base segment tree 506A stored on storage unit(s) 108-109 is merged with one or more of the SMSTs 506B stored on the cache device(s) 114 to create an updated base segment tree 506A. In one embodiment, the updated base segment tree 506A is replicated on the storage unit(s) 108-109 in response to the performance of the merger. Moreover, in one embodiment, the one or more of the SMSTs 506B stored on the cache device(s) 114 and the previous base segment tree 506A residing in storage unit(s) 108-109 are erased in response to the performance of the merger. In this way, the storage unit(s) 108-109 and the cache device(s) 114 are subjected to a reduced frequency of program/erase cycles (P/E cycles), which in turn can increase the lifecycle of storage unit(s) 108-109 and the cache device(s) 114. In one embodiment, after the updated based segment tree 506A has been created, the requested data is provided to the requesting one or more clients.

In one embodiment, the updates represented by the SMST(s) 506B are applied to the base segment tree(s) 506A in response to the storage/cache manager 117 determining that the SMST(s) 506B within the cache device(s) 114 have exceeded a threshold storage capacity. In one embodiment, the updates represented by the SMST(s) 506B are applied to the base segment tree(s) 506A in response to the storage/cache manager 117 determining that the number of master or grandmaster SMST(s) 506B within the cache device(s) 114 has exceeded a threshold number. In one embodiment, based on the determination that that the SMST(s) 506B within the cache device(s) 114 have exceeded a threshold storage capacity or the determination that the number of master or grandmaster SMST(s) 506B within the cache device(s) 114 has exceeded a threshold number, then the base segment tree 506A stored on storage unit(s) 108-109 is merged with one or more of the SMSTs 506B stored on the cache device(s) 114 to create an updated base segment tree 506A. In one embodiment, the updated base segment tree 506A is replicated on the storage unit(s) 108-109 in response to the performance of the merger. Moreover, in one embodiment, the one or more of the SMSTs 506B stored on the cache device(s) 114 and the previous base segment tree 506A residing in storage unit(s) 108-109 are erased in response to the performance of the merger. In this way, the storage unit(s) 108-109 and the cache device(s) 114 are subjected to a reduced frequency of program/erase cycles (P/E cycles), which in turn can increase the lifecycle of storage unit(s) 108-109 and the cache device(s) 114.

Figure 6:
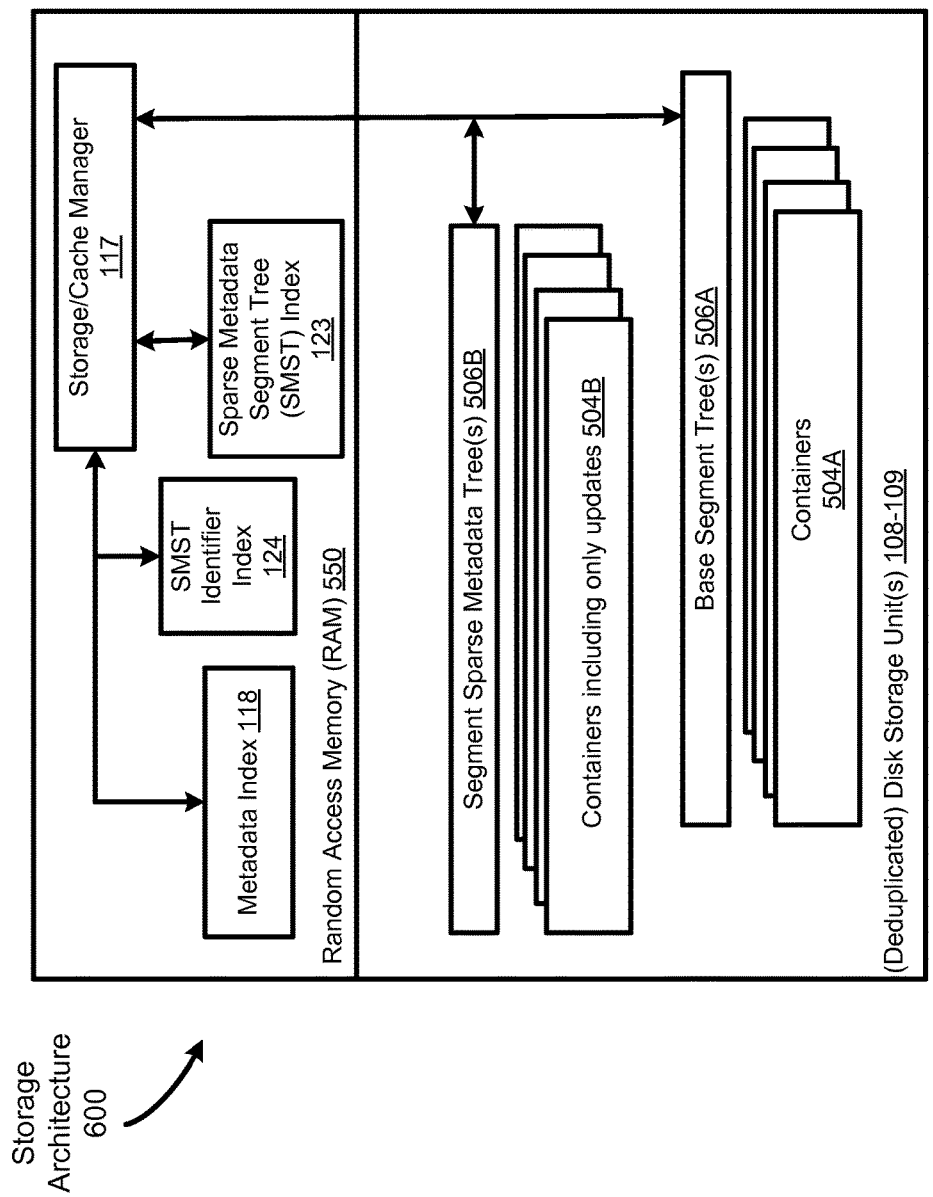
FIG. 6 illustrates a two-layer storage architecture that includes one or more SMSTs according to one embodiment of the invention.

FIG. 6 illustrates storage architecture 600 of a storage system according to one embodiment of the invention. In one embodiment, the storage architecture 600 is part of the storage system 120 described above in connection with FIG. 1. In one embodiment, the storage architecture 600 performs some of the processes or functionalities described above in connection with at least one of FIG. 1, 2, 3, 4, or 5. In one embodiment, the storage architecture 600 is made up of multiple levels. In the illustrated embodiment of the storage architecture 600, there are two levels—(i) a first level made up of disk storage unit(s) 108-109; (ii) a second level made up of Random Access Memory (RAM) 550. In one embodiment, storage architecture 600 has more than two levels. In one embodiment, storage architecture 500 has less than two levels.

Please note that storage architecture 600 is similar to the storage architecture 500 described above in connection with FIG. 5. For the sake of clarity and brevity, only the differences between the storage architecture 600 and the storage architecture 500 are discussed below in connection with FIG. 6.

One difference between storage architecture 600 and storage architecture 500 relates to the number of levels of the architecture. The first level of storage architecture 600 includes disk storage unit(s) 108-109, which are described above. In one embodiment of storage architecture 600, disk storage unit(s) 108-109 include container(s) 504A-B to store data files and the updates to the data file, respectively. As explained above, each of containers 504A-B can include segmented chunks after deduplication. In one embodiment of storage architecture 600, disk storage unit(s) 108-109 also contain one or more base segment trees 506A-B. Each base segment tree 506A-B is described above in connection with at least one of FIG. 1 or 5. In one embodiment of storage architecture 600, all of the SMST(s) 506B and the containers 504B reside in storage unit(s) 108-109 together with the base segment tree(s) 506A and the containers 504B. In one embodiment of storage architecture 600, the second layer is random access memory (RAM) 220, which is described above in the description provided in connection with FIG. 5.

In one embodiment of storage architecture 600, due to the SMST(s) 506B, the storage unit(s) 108-109 do not perform an unnecessarily large number of input/output operations per second (IOPS) due to at least one of a read-erase-modify-write process needed for randomly written data, a read-modify-write process, or a read-write process that the cache device(s) 114 is subjected to as the data of the containers 504A are updated using containers 504B. In one embodiment of storage architecture 600, the SMSTs 506B are merely written to the storage unit(s) 108-109 using a read-write process that is performed within the storage unit(s) 108-109. In this embodiment, when the storage/cache manager 117 determines that the all of the SMSTs 506B stored in the storage unit(s) 108-109 have reached a predetermined storage capacity of the storage unit(s) 108-109, then the storage/cache manager 117 triggers the merging of the incremental SMSTs 506B into a master SMST 506B and deletes all of the incremental SMSTs 506B making up the master SMST 506B. In this way, the frequency of program/erase cycles (P/E cycles) of the storage unit(s) 108-109 can be reduced or predicted more accurately, which in turn can assist with extending the lifecycle of the storage unit(s) 108-109. In one embodiment of storage architecture 600, after the single master SMST 506B has been created, additional individual SMSTs 506B are written to the storage unit(s) 108-109 until these additional individual SMSTs 506B reach a predetermined storage capacity of the storage unit(s) 108-109 and are merged to form another master SMST, as described above. Thus, in one embodiment of storage architecture 600, there can be multiple master SMSTs 506B written to the storage unit(s) 108-109. In one embodiment of storage architecture 600, when the multiple master SMSTs 506B stored in the storage unit(s) 108-109 have reached a predetermined storage capacity of the storage unit(s) 108-109, then the storage/cache manager 117 triggers the merging of the multiple SMSTs 506B into a single grandmaster SMST 506B and deletes all of the individual master SMSTs 506B making up the grandmaster SMST 506B to free up space on the storage unit(s) 108-109. In this way, the frequency of program/erase cycles (P/E cycles) of the storage unit(s) 108-109 can be reduced, which in turn extends the lifecycle of the storage unit(s) 108-109.

In one embodiment of storage architecture 600, the updates represented by the SMST(s) 506B are not applied to the base segment tree(s) 506A until a request to read data stored in the storage unit(s) 108-109 is received by a storage system implementing storage architecture 500. In one embodiment of storage architecture 600, the request to read data is received from one or more clients (e.g., client(s) 101-102 of FIG. 1). In one embodiment of storage architecture 600, in response to the request being received, storage/cache manager 117 determines based on metadata information within the request whether the requested data is stored in unit(s) 108-109. In one embodiment of storage architecture 600, the manager 117 makes this determination in accordance with the description provided above in FIG. 1. In one embodiment of storage architecture 600, the manager 117 also determines, based on the SMST identifier index 124 and the SMST index 123, whether the data stored within unit(s) 108-109 and represented by base segment tree(s) 506A has one or more corresponding SMSTs 506B that include updates to the data. In one embodiment of storage architecture 600, if the requested data needs to be updated before being provided back to the requesting client, then the base segment tree 506A stored on storage unit(s) 108-109 is merged with one or more of the SMSTs 506B stored on the storage unit(s) 108-109 to create an updated base segment tree 506A. In one embodiment of storage architecture 600, the one or more of the SMSTs 506B stored on the cache device(s) 114 and the previous base segment tree 506A residing in storage unit(s) 108-109 are erased in response to the performance of the merger. In this way, the storage unit(s) 108-109 are subjected to a reduced frequency of program/erase cycles (P/E cycles), which in turn can increase the lifecycle of storage unit(s) 108-109. In one embodiment of storage architecture 600, after the updated based segment tree 506A has been created, the requested data is provided to the requesting one or more clients.

In one embodiment of storage architecture 600, the updates represented by the SMST(s) 506B are applied to the base segment tree(s) 506A in response to the storage/cache manager 117 determining that the SMST(s) 506B within the storage unit(s) 108-109 have exceeded a threshold storage capacity. In one embodiment of storage architecture 600, the updates represented by the SMST(s) 506B are applied to the base segment tree(s) 506A in response to the storage/cache manager 117 determining that the number of master or grandmaster SMST(s) 506B within the storage unit(s) 108-109 has exceeded a threshold number. In one embodiment of storage architecture 600, based on the determination that that the SMST(s) 506B within the storage unit(s) 108-109 have exceeded a threshold storage capacity or the determination that the number of master or grandmaster SMST(s) 506B within the storage unit(s) 108-109 has exceeded a threshold number, then the base segment tree 506A stored on storage unit(s) 108-109 is merged with one or more of the SMSTs 506B stored on the storage unit(s) 108-109 to create an updated base segment tree 506A. In one embodiment of storage architecture 600, the one or more of the SMSTs 506B stored on the storage unit(s) 108-109 and the previous base segment tree 506A residing in storage unit(s) 108-109 are erased in response to the performance of the merger. In this way, the storage unit(s) 108-109 are subjected to a reduced frequency of program/erase cycles (P/E cycles), which in turn can increase the lifecycle of storage unit(s) 108-109.

Figure 7:
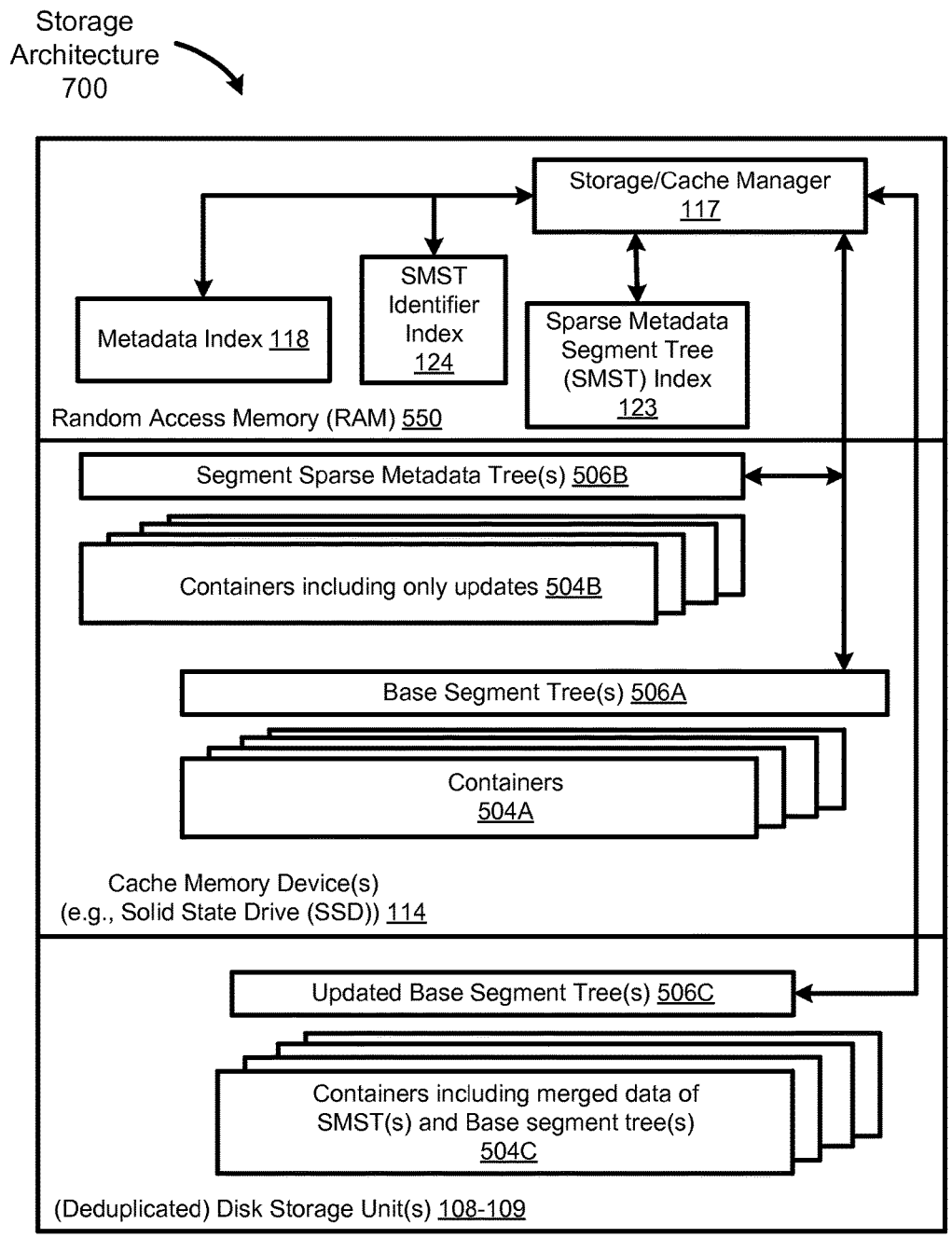
FIG. 7 illustrates another three-layer storage architecture that includes one or more SMSTs according to one embodiment of the invention.

FIG. 7 illustrates storage architecture 700 of a storage system according to one embodiment of the invention. In one embodiment, the storage architecture 700 is part of the storage system 120 described above in connection with FIG. 1. In one embodiment, the storage architecture 700 performs some of the processes or functionalities described above in connection with at least one of FIG. 1, 2, 3, 4, 5, or 6. In one embodiment, the storage architecture 700 is made up of multiple levels. In the illustrated embodiment of the storage architecture 700, there are three levels—(i) a first level made up of disk storage unit(s) 108-109; (ii) a second level made up of cache memory device(s) 114, and (iii) a third level made up of Random Access Memory (RAM) 550. In one embodiment, storage architecture 700 has more than three levels. In one embodiment, storage architecture 700 has less than three levels.

Please note that storage architecture 700 is similar to the storage architecture 500 described above in connection with FIG. 5. For the sake of clarity and brevity, only the differences between the storage architecture 700 and the storage architecture 500 are discussed below in connection with FIG. 7.

One difference between storage architecture 700 and storage architecture 500 relates to the functions of storage unit(s) 108-109 and cache device(s) 114 of the architecture 700.

The first level of storage architecture 700 includes disk storage unit(s) 108-109. In one embodiment, disk storage unit(s) 108-109 are similar to or the same as the disk storage unit(s) 108-109 described above in connection with at least one of FIG. 1, 5, or 6. In one embodiment of storage architecture 700, disk storage unit(s) 108-109 include container(s) 504C to store data files that are formed from a merger of data files within containers 504A and 504B. In one embodiment of storage architecture 700, disk storage unit(s) 108-109 also contain one or more updated base segment tree(s) 506C that are based on a merger of one or more SMST(s) 506B and base segment tree(s) 506A.

The second level of the storage architecture 700 includes cache device(s) 114. In one embodiment of storage architecture 700, cache device(s) 114 are similar to or the same as the disk storage unit(s) 108-109 described above in connection with at least one of FIG. 1, 5, or 6. In one embodiment of storage architecture 700, the cache device(s) 114 include container(s) 504A-B, which are described above in connection with at least one of FIG. 1, 5, or 6. In one embodiment of storage architecture 700, the cache device(s) 114 include base segment tree(s) 506A and SMST(s) 506B, which are described above in connection with at least one of FIG. 1, 5, or 6. In storage architecture 700, the third layer is random access memory (RAM) 220, which is described above in the description provided in connection with at least one of FIG. 5 or 6.

In one embodiment of architecture 700, due to the SMST(s) 506B, the cache device(s) 114 does not perform an unnecessarily large number of input/output operations per second (IOPS), as explained above in connection with FIG. 5. In one embodiment of architecture 700, the updates represented by the SMST(s) 506B (which are explained above in connection with at least one of FIG. 5 or 6) are not applied to the base segment tree(s) 506A until a request to read data stored in the storage unit(s) 108-109 is received by a storage system implementing storage architecture 700. In one embodiment of architecture 700, the request to read data is received from one or more clients (e.g., client(s) 101-102 of FIG. 1). In one embodiment of architecture 700, in response to the request being received, storage/cache manager 117 determines based on metadata information within the request that the requested data is stored in cache device(s) 114 without determining whether the requested data is stored in storage unit(s) 108-109. In one embodiment, the manager 117 makes this determination in accordance with the description provided above in FIG. 1. In one embodiment, the manager 117 also determines, based on the SMST identifier index 124 and the SMST index 123, whether the data stored within unit(s) 108-109 and represented by base segment tree(s) 506A has one or more corresponding SMSTs 506B that include updates to the data. In one embodiment, if the requested data needs to be updated before being provided back to the requesting client, then the base segment tree 506A stored on cache device(s) 114 is merged with one or more of the SMSTs 506B stored on the cache device(s) 114 to create an updated base segment tree 506C. In one embodiment, the updated base segment tree 506C is replicated on the storage unit(s) 108-109 in response to the performance of the merger. Moreover, in one embodiment, the one or more of the SMSTs 506B and the previous base segment tree(s) 506A residing in cache device(s) 114 are erased in response to the performance of the merger. In this way, the storage unit(s) 108-109 and the cache device(s) 114 are subjected to a reduced frequency of program/erase cycles (P/E cycles), which in turn can increase the lifecycle of storage unit(s) 108-109 and the cache device(s) 114. In one embodiment, after the updated based segment tree 506C has been created, the requested data is provided to the requesting one or more clients.

In one embodiment of architecture 700, the updates represented by the SMST(s) 506B are applied to the base segment tree(s) 506A in response to the storage/cache manager 117 determining that the SMST(s) 506B within the cache device(s) 114 have exceeded a threshold storage capacity. In one embodiment, the updates represented by the SMST(s) 506B are applied to the base segment tree(s) 506A in response to the storage/cache manager 117 determining that the number of master or grandmaster SMST(s) 506B within the cache device(s) 114 has exceeded a threshold number. In one embodiment, based on the determination that that the SMST(s) 506B within the cache device(s) 114 have exceeded a threshold storage capacity or the determination that the number of master or grandmaster SMST(s) 506B within the cache device(s) 114 has exceeded a threshold number, then the base segment tree 506A stored on cache device(s) 114 is merged with one or more of the SMSTs 506B stored on the cache device(s) 114 to create an updated base segment tree 506C. In one embodiment, the updated base segment tree 506C is replicated on the storage unit(s) 108-109 in response to the performance of the merger. Moreover, in one embodiment, the one or more of the SMSTs 506B and the previous base segment tree 506A residing in cache device(s) 114 are erased in response to the performance of the merger. In this way, the storage unit(s) 108-109 and the cache device(s) 114 are subjected to a reduced frequency of program/erase cycles (P/E cycles), which in turn can increase the lifecycle of storage unit(s) 108-109 and the cache device(s) 114.

Figure 8:
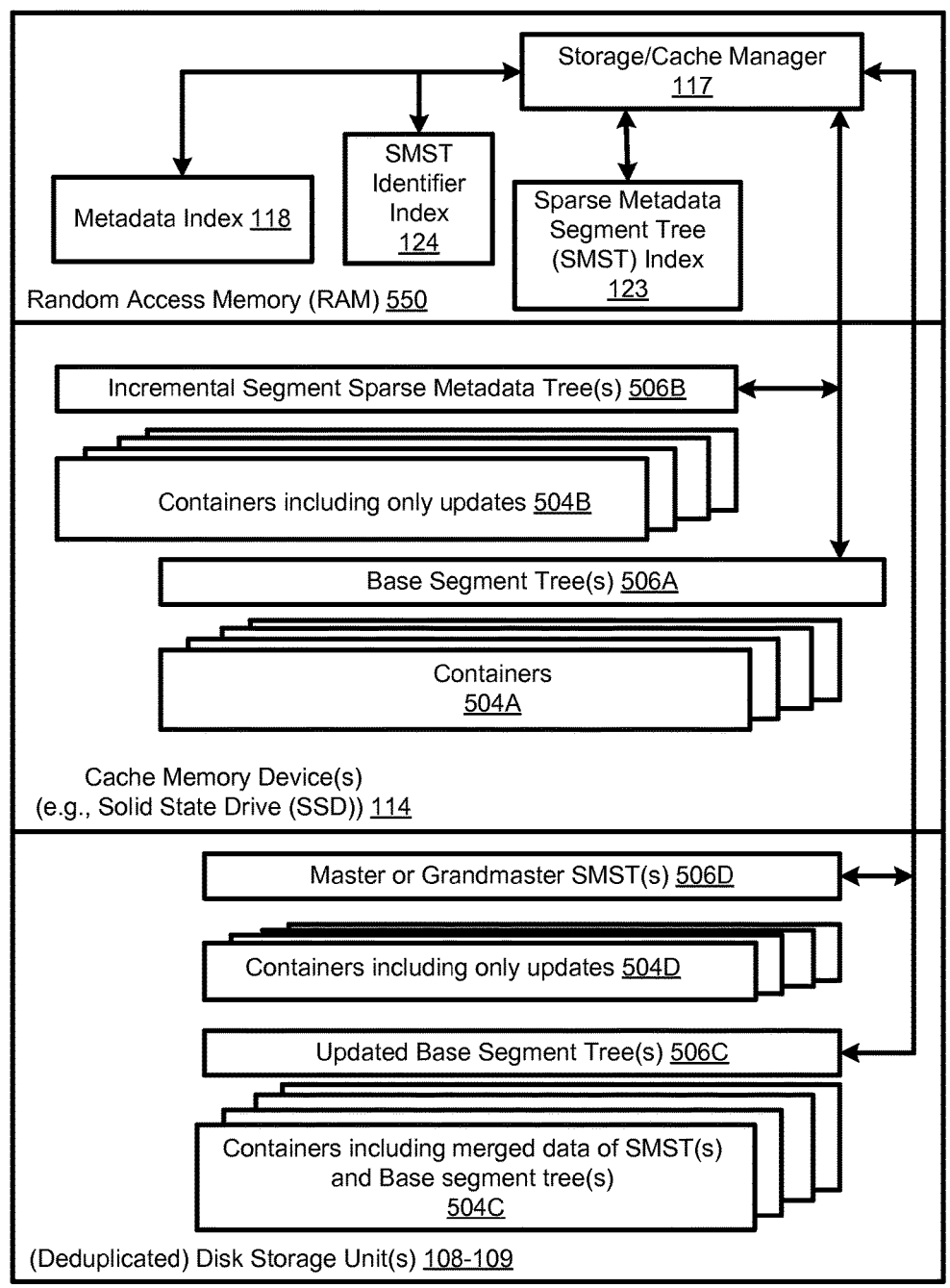
FIG. 8 illustrates yet another three-layer storage architecture that includes one or more SMSTs according to one embodiment of the invention.

FIG. 8 illustrates storage architecture 800 of a storage system according to one embodiment of the invention. In one embodiment, the storage architecture 800 is part of the storage system 120 described above in connection with FIG. 1. In one embodiment, the storage architecture 800 performs some of the processes or functionalities described above in connection with at least one of FIG. 1, 2, 3, 4, 5, 6, or 7. In one embodiment, the storage architecture 800 is made up of multiple levels. In the illustrated embodiment of the storage architecture 800, there are three levels—(i) a first level made up of disk storage unit(s) 108-109; (ii) a second level made up of cache memory device(s) 114, and (iii) a third level made up of Random Access Memory (RAM) 550. In one embodiment, storage architecture 800 has more than three levels. In one embodiment, storage architecture 800 has less than three levels.

Please note that storage architecture 800 is similar to the storage architecture 500 described above in connection with FIG. 5. For the sake of clarity and brevity, only the differences between the storage architecture 800 and the storage architecture 500 are discussed below in connection with FIG. 8.

One difference between storage architecture 800 and storage architecture 500 relates to the functions of storage unit(s) 108-109 and cache device(s) 114 of the architecture 800.

The first level of storage architecture 800 includes disk storage unit(s) 108-109. In one embodiment, disk storage unit(s) 108-109 are similar to or the same as the disk storage unit(s) 108-109 described above in connection with at least one of FIG. 1, 5, 6, or 7. In one embodiment of storage architecture 800, disk storage unit(s) 108-109 includes container(s) 504D to store cumulative updates to data stored in container 504A. In one embodiment of architecture 800, the cumulative updates stored in container(s) 504 are formed from a merger of data within container(s) 504B. In one embodiment of storage architecture 700, disk storage unit(s) 108-109 also contain at least one of master SMST(s) 506D or grandmaster SMST(s) 506D that are based on a merger of multiple incremental SMSTs 506B. In one embodiment of storage architecture 800, disk storage unit(s) 108-109 include container(s) 504C to store data files that are formed from a merger of data files within at least one of container(s) 504A, 504B, 504C, or 504D. In one embodiment of storage architecture 800, disk storage unit(s) 108-109 also contain one or more updated base segment tree(s) 506C that are based on a merger of one or more base segment trees 506A with at least one of incremental SMST(s) 506B, master SMST(s) 506D or grandmaster SMST(s) 506D.

The second level of the storage architecture 800 includes cache device(s) 114. In one embodiment of storage architecture 800, cache device(s) 114 are similar to or the same as the disk storage unit(s) 108-109 described above in connection with at least one of FIG. 1, 5, 6, or 7. In one embodiment of storage architecture 800, the cache device(s) 114 include container(s) 504A-B, which are described above in connection with at least one of FIG. 1, 5, 6, or 7. In one embodiment of storage architecture 700, the cache device(s) 114 include base segment tree(s) 506A, which is described above in connection with at least one of FIG. 1, 5, 6, or 7.

In one embodiment of storage architecture 800, the cache device(s) 114 include incremental SMST(s) 506B. These SMST(s) are similar to the SMST(s) 506B described above in connection with at least one of FIG. 1, 5, 6, or 7. In one embodiment of storage architecture 800, the cache device(s) 114 only stores incremental SMST(s). In this embodiment, all other types of SMST(s) are stored in storage unit(s) 108-109. In storage architecture 700, the third layer is random access memory (RAM) 220, which is described above in the description provided in connection with at least one of FIG. 5, 6, or 7.

In one embodiment of architecture 800, due to the incremental SMST(s) 506B, the cache device(s) 114 does not perform an unnecessarily large number of input/output operations per second (IOPS), as explained above in connection with FIG. 5. In one embodiment of architecture 700, the updates represented by the SMST(s) 506B (which are explained above in connection with at least one of FIG. 5, 6, or 7) are not applied to the base segment tree(s) 506A until a request to read data stored in the storage unit(s) 108-109 is received by a storage system implementing storage architecture 800. In one embodiment of architecture 800, the request to read data is received from one or more clients (e.g., client(s) 101-102 of FIG. 1). In one embodiment of architecture 800, in response to the request being received, storage/cache manager 117 determines based on metadata information within the request that the requested data is stored in cache device(s) 114 without determining whether the requested data is stored in storage unit(s) 108-109. In one embodiment, the manager 117 makes this determination in accordance with the description provided above in FIG. 1. In one embodiment, the manager 117 also determines, based on the SMST identifier index 124 and the SMST index 123, whether the data stored within unit(s) 108-109 and represented by base segment tree(s) 506A has one or more corresponding SMSTs 506B that include updates to the data. In one embodiment, if the requested data needs to be updated before being provided back to the requesting client, then the base segment tree 506A stored on cache device(s) 114 is merged with one or more of the incremental SMSTs 506B or master/grandmaster 506D stored on the storage unit(s) 108-109 to create an updated base segment tree 506C. In one embodiment, the updated base segment tree 506C is replicated on the storage unit(s) 108-109 in response to the performance of the merger. Moreover, in one embodiment, the SMST(s) 506B, the SMST(s) 506D, and the previous base segment tree(s) 506A are erased in response to the performance of the merger. In this way, the storage unit(s) 108-109 and the cache device(s) 114 are subjected to a reduced frequency of program/erase cycles (P/E cycles), which in turn can increase the lifecycle of storage unit(s) 108-109 and the cache device(s) 114. In one embodiment, after the updated based segment tree 506C has been created, the requested data is provided to the requesting one or more clients.

In one embodiment of architecture 800, the updates represented by the incremental SMST(s) 506B or master/grandmaster SMST(s) 506D are applied to the base segment tree(s) 506A in response to the storage/cache manager 117 determining that the SMST(s) 506B within the cache device(s) 114 or the master/grandmaster SMST(s) 506D within the storage unit(s) 114 have exceeded a threshold storage capacity. In one embodiment of architecture 800, the updates represented by the SMST(s) 506D are applied to the base segment tree(s) 506A in response to the storage/cache manager 117 determining that the number of master or grandmaster SMST(s) 506D within the storage unit(s) 108-109 has exceeded a threshold number. In one embodiment, based on the determination that that the SMST(s) 506B within the cache device(s) 114 or the SMST(s) 506D within the storage unit(s) 108-109 have exceeded a threshold storage capacity or the determination that the number of master or grandmaster SMST(s) 506D within the storage unit(s) 108-109 has exceeded a threshold number, then the base segment tree 506A stored on cache device(s) 114 is merged with at least one of the SMST(s) 506B stored on the cache device(s) 114 or the SMST(s) 506D stored on the storage unit(s) 108-109 to create an updated base segment tree 506C. In one embodiment, the updated base segment tree 506C is replicated on the storage unit(s) 108-109 in response to the performance of the merger. Moreover, in one embodiment, the SMST(s) 506B, the SMST(s) 506D, and the previous base segment tree 506A are erased in response to the performance of the merger. In this way, the storage unit(s) 108-109 and the cache device(s) 114 are subjected to a reduced frequency of program/erase cycles (P/E cycles), which in turn can increase the lifecycle of storage unit(s) 108-109 and the cache device(s) 114.

Figures 9A, 9B:
FIGS. 9A-B respectively illustrate two data structures used to represent one or more SMSTs according to one embodiment of the invention.

FIGS. 9A-9B respectively illustrate two data structures 900 and 950 used to represent one or more SMSTs according to one embodiment of the invention.

With regard to FIG. 9A, in one embodiment, an SMST includes metadata segments that correspond to metadata segments of a base segment tree. In one embodiment, a metadata segment of an SMST is represented as a data structure 900 that includes a header 902 with at least one valid bitmap 904 for each of the possible other metadata segments or data segments that are referenced by that specific metadata segment. In one embodiment, the data structure 900 includes a fingerprint 906 of the corresponding metadata segment of the base segment tree that corresponds to the SMST. In one embodiment, the data structure 900 includes one or more unique identification references 908 that provide a link to the corresponding metadata segment of the base segment tree that corresponds to the SMST. In one embodiment, an SMST is used to locate its corresponding base segment tree by determining whether the fingerprint of the corresponding metadata segment of the base segment tree matches the fingerprint of the SMST. If the fingerprints are exact matches of each other, then the located base segment tree corresponds to the SMST. In one embodiment, when a single base segment tree corresponds to multiple versions of an SMST, each of these versions includes a generation identification number 910, which is used to determine which version of the SMST includes the most up-to-date information and which version of the SMST should be merged with the corresponding base segment tree for caching, reading, updating, or restoring files represented by base segment trees and SMSTs.

With regard to FIG. 9B, in one embodiment, a metadata segment of an SMST is represented as a data structure 950 that includes an identifier 912 in a form of a file handle 914 (e.g., file handle 207 of FIG. 2) and an offset 916 identifying a metadata segment or a data segment of a corresponding base segment tree. In one embodiment, the data structure 950 also includes the fingerprint of the metadata segment that represents the file handle 914 of the corresponding base segment tree. This feature enables the data structure 950 to locate its corresponding base segment tree. In one embodiment, the data structure 950 can include the identification references 908 and generation ID 910, each of which are described above in connection with FIG. 9A.

Figure 10:
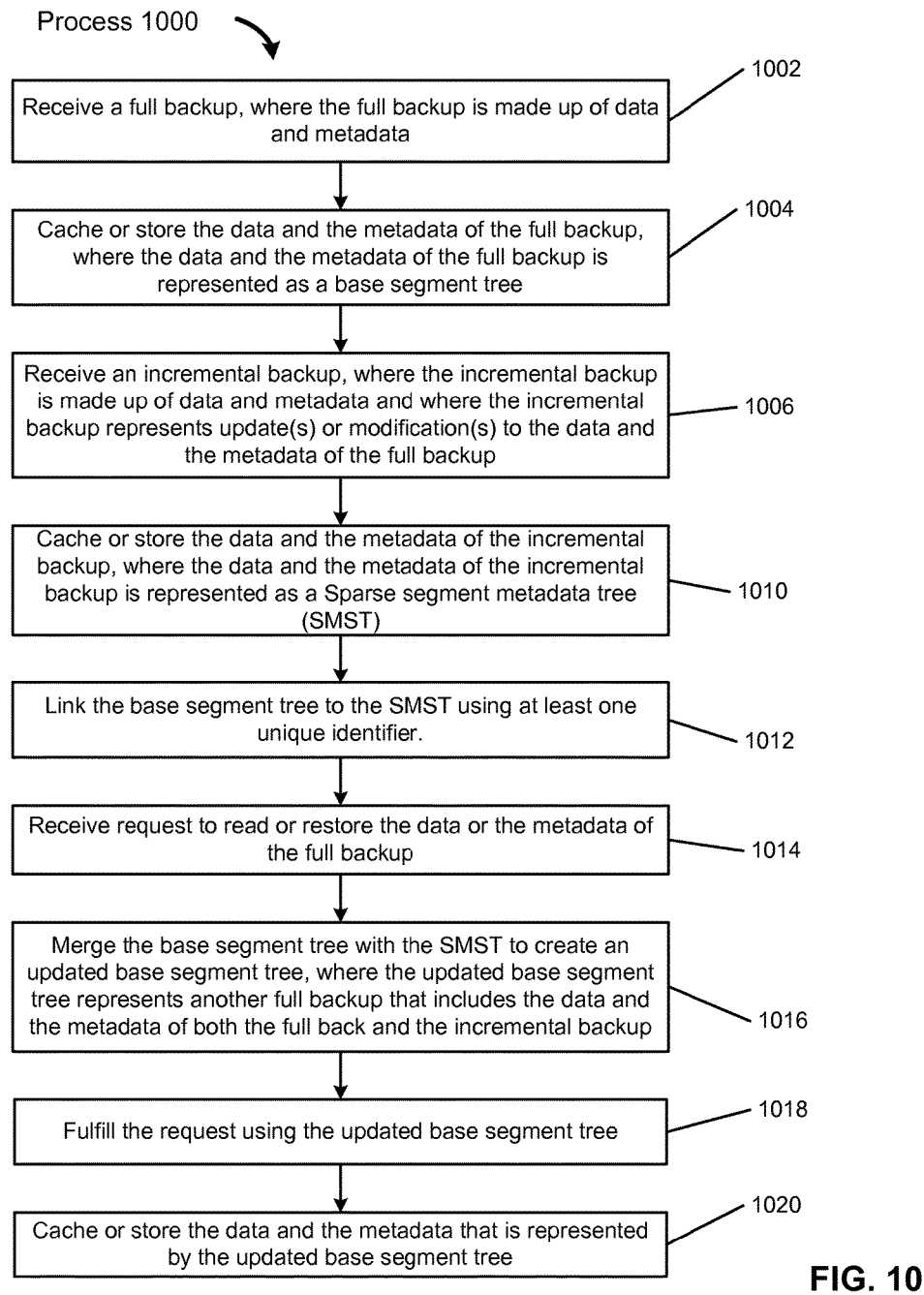
FIG. 10 is a flow diagram illustrating a process of providing data storage services of a storage system using one or more SMSTs according to one embodiment of the invention.

FIG. 10 is a flow diagram illustrating a process 1000 of providing data storage services of a storage system using one or more SMSTs according to one embodiment of the invention. Process 1000 can be performed by at least one of the modules or processing logic described above in connection with storage system 100. For example, and in one embodiment, process 1000 is performed by at least one of storage service engine 106 or deduplication logic 107.

Process 1000 begins at block 1002. In one embodiment, at block 1002, a storage system (e.g., system 100 of FIG. 1) receives a full backup. In one embodiment, the full backup is received in accordance with the descriptions provided above in connection with at least one of FIG. 1, 2, 3, 4, 5, 6, 7, 8, or 9. In one embodiment, at block 1004, the storage system (e.g., system 100 of FIG. 1) caches or stores the full backup as a base segment tree in accordance with the descriptions provided above in connection with at least one of FIG. 1, 2, 3, 4, 5, 6, 7, 8, or 9. In one embodiment, at block 1006, the storage system (e.g., system 100 of FIG. 1) receives an incremental backup that updates or modifies the data or metadata represented by the base segment tree. In one embodiment, at block 1010, the storage system (e.g., system 100 of FIG. 1) stores or caches the incremental backup as an SMST in accordance with the descriptions provided above in connection with at least one of FIG. 1, 2, 3, 4, 5, 6, 7, 8, or 9. In one embodiment, at block 1012, the storage system (e.g., system 100 of FIG. 1) links the base segment tree to the SMST using unique identifiers in accordance with the descriptions provided above in connection with at least one of FIG. 1, 2, 3, 4, 5, 6, 7, 8, or 9. In one embodiment, at block 1014, the storage system (e.g., system 100 of FIG. 1) receives a request to read or restore the base segment tree after the SMST is cached or stored in accordance with the descriptions provided above in connection with at least one of FIG. 1, 2, 3, 4, 5, 6, 7, 8, or 9. In one embodiment, at block 1016, the storage system (e.g., system 100 of FIG. 1) merges the base segment tree with the SMST in accordance with the descriptions provided above in connection with at least one of FIG. 1, 2, 3, 4, 5, 6, 7, 8, or 9. In one embodiment, at block 1018, the storage system (e.g., system 100 of FIG. 1) fulfils the request to read or restore the base segment tree using the updated base segment tree in accordance with the descriptions provided above in connection with at least one of FIG. 1, 2, 3, 4, 5, 6, 7, 8, or 9. In one embodiment, at block 1022, the storage system (e.g., system 100 of FIG. 1) caches or stores data and metadata represented by the updated base segment tree in accordance with the descriptions provided above in connection with at least one of FIG. 1, 2, 3, 4, 5, 6, 7, 8, or 9.

Figure 11A:
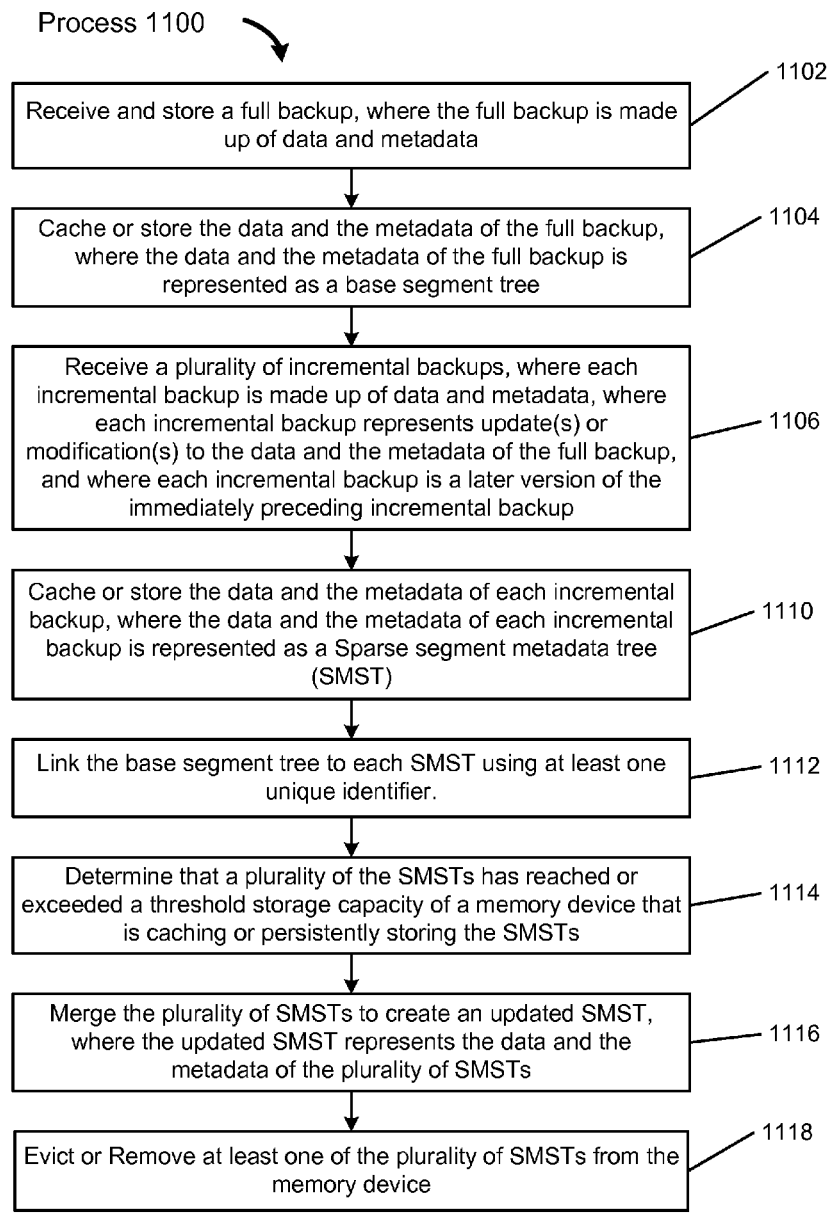
FIGS. 11A-11B are two flow diagrams illustrating two respective processes of optimizing a cache memory device of a storage system using one or more SMSTs according to one embodiment of the invention.
Figure 11B:
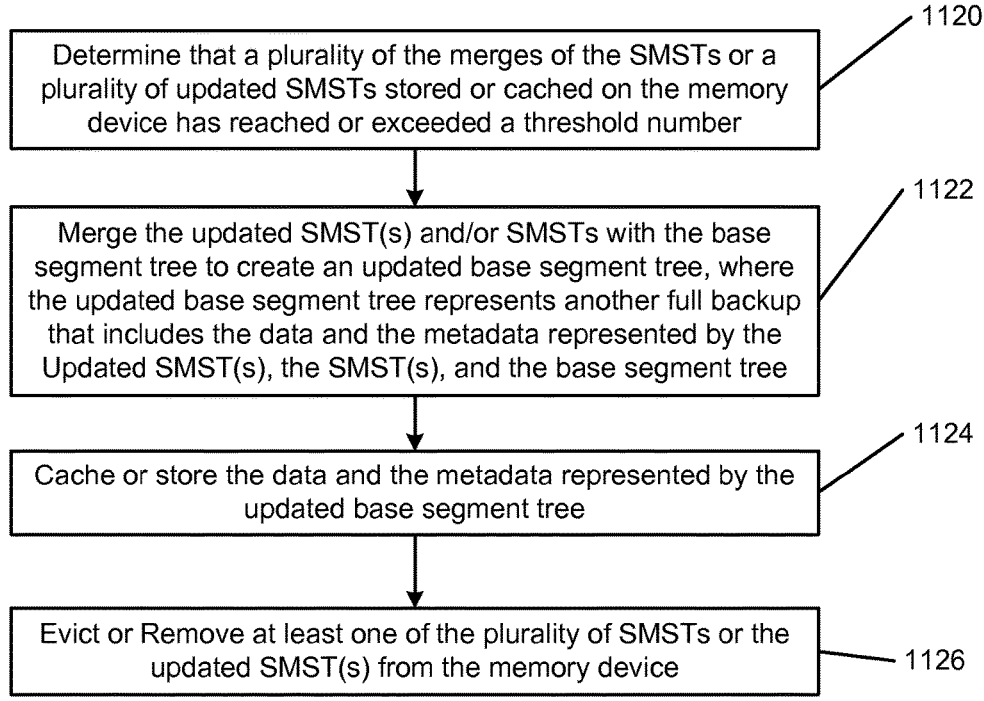
Figure 12:
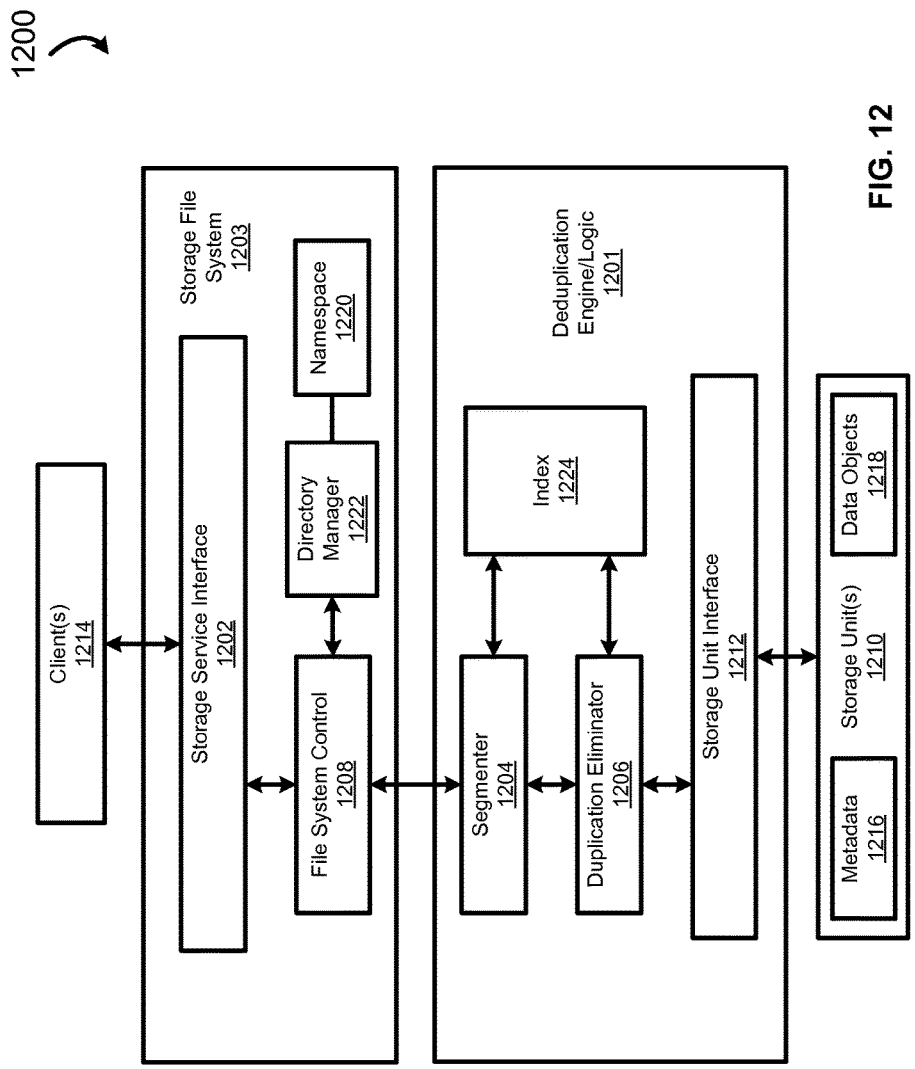
FIG. 12 is a block diagram illustrating a deduplicated storage system according to one embodiment of the invention.

FIGS. 11A-11B are two flow diagrams illustrating two respective processes 1100 and 1150 of optimizing a cache memory device of a storage system using one or more SMSTs according to one embodiment of the invention. Each of processes 1100 and 1150 can be performed by at least one of the modules or processing logic described above in connection with storage system 100. For example, and in one embodiment, each of processes 1100 and 1150 is performed by at least one of storage service engine 106 or deduplication logic 107.

With regard to FIG. 11A, process 1100 begins at block 1102. In one embodiment, at block 1112, a storage system (e.g., system 100 of FIG. 1) receives a full backup. In one embodiment, the full backup is received in accordance with the descriptions provided above in connection with at least one of FIG. 1, 2, 3, 4, 5, 6, 7, 8, or 9. In one embodiment, at block 1104, the storage system (e.g., system 100 of FIG. 1) caches or stores the full backup as a base segment tree in accordance with the descriptions provided above in connection with at least one of FIG. 1, 2, 3, 4, 5, 6, 7, 8, or 9. In one embodiment, at block 1106, the storage system (e.g., system 100 of FIG. 1) receives at least two incremental backups that update or modify the data or metadata represented by the base segment tree. In one embodiment, at block 1110, the storage system (e.g., system 100 of FIG. 1) stores or caches each of the incremental backups as an SMST in accordance with the descriptions provided above in connection with at least one of FIG. 1, 2, 3, 4, 5, 6, 7, 8, or 9. In one embodiment, at block 1112, the storage system (e.g., system 100 of FIG. 1) links the base segment tree to each of the SMSTs using unique identifiers in accordance with the descriptions provided above in connection with at least one of FIG. 1, 2, 3, 4, 5, 6, 7, 8, or 9. In one embodiment, at block 1114, the storage system (e.g., system 100 of FIG. 1) determines that a plurality of the SMSTs has reached or exceeded a threshold storage capacity of a memory device that is caching or persistently storing the SMSTs in accordance with the descriptions provided above in connection with at least one of FIG. 1, 2, 3, 4, 5, 6, 7, 8, or 9. In one embodiment, at block 1116, the storage system (e.g., system 100 of FIG. 1) merges the plurality of SMSTs that exceed the threshold storage capacity of the memory device with each other to form an updated SMST (e.g., a master SMST or a grandmaster SMST) in accordance with the descriptions provided above in connection with at least one of FIG. 1, 2, 3, 4, 5, 6, 7, 8, or 9. In one embodiment, at block 1118, the storage system (e.g., system 100 of FIG. 1) evicts or removes at least one of the plurality of SMSTs that exceeded the predetermined threshold storage capacity from the memory device in accordance with the descriptions provided above in connection with at least one of FIG. 1, 2, 3, 4, 5, 6, 7, 8, or 9. In one embodiment, at block 1118, each of the plurality of SMSTs that exceeded the predetermined threshold storage capacity is evicted from the memory device in response to the merger. In one embodiment, at block 1118, each of the plurality of SMSTs that exceeded the predetermined threshold storage capacity is evicted from the memory device in response to the merger and only the updated SMST (e.g., a master SMST or a grandmaster SMST) is stored or cached in the memory device.

With regard to FIG. 11B, process 1150 begins at block 1120. In one embodiment, at block 1120, a storage system (e.g., system 100 of FIG. 1) determines that a plurality of the merges of the SMSTs or a plurality of updated SMSTs (e.g., master SMSTs or grandmaster SMSTs) stored or cached on the memory device has reached or exceeded a threshold number in accordance with the descriptions provided above in connection with at least one of FIG. 1, 2, 3, 4, 5, 6, 7, 8, or 9. In one embodiment, at block 1122, the storage system (e.g., system 100 of FIG. 1) merges the updated SMST(s) and/or SMSTs with the base segment tree to create an updated base segment tree in accordance with the descriptions provided above in connection with at least one of FIG. 1, 2, 3, 4, 5, 6, 7, 8, or 9. In one embodiment, at block 1122, the updated base segment tree represents a full backup or complete backup that includes the data and the metadata represented by the Updated SMST(s), the SMST(s), and the base segment tree. In one embodiment, at block 1124, the storage system (e.g., system 100 of FIG. 1) caches or stores the data and the metadata represented by the updated base segment tree in accordance with the descriptions provided above in connection with at least one of FIG. 1, 2, 3, 4, 5, 6, 7, 8, or 9. In one embodiment, at block 1126, the storage system (e.g., system 100 of FIG. 1) evicts or removes at least one of the plurality of SMSTs or at least one of the plurality of updated SMSTs that exceeded the predetermined threshold number from the memory device in accordance with the descriptions provided above in connection with at least one of FIG. 1, 2, 3, 4, 5, 6, 7, 8, or 9. In one embodiment, at block 1126, each of the plurality of SMSTs and each of plurality of updated SMSTs that exceeded the predetermined threshold storage capacity is evicted from the memory device in response to the merger. In one embodiment, at block 1126, each of the plurality of SMSTs and each of plurality of updated SMSTs that exceeded the predetermined threshold number is evicted from the memory device in response to the merger and only the updated base segment tree is stored or cached in the memory device.

FIG. 1200 is a block diagram illustrating a deduplication storage system 1200 according to one embodiment of the invention. For example, deduplication storage system 1200 may be implemented as part of a deduplication storage system as described above, such as, for example, the deduplication storage system as a client and/or a server described above. In one embodiment, the system 1200 may be part of system 104 of FIG. 1 and configured to work with the storage/cache manager 117 described above in connection with FIG. 1.

In one embodiment, storage system 1200 may represent a file server (e.g., an appliance used to provide network attached storage (NAS) capability), a block-based storage server (e.g., used to provide storage area network (SAN) capability), a unified storage device (e.g., one which combines NAS and SAN capabilities), a near-line storage device, a direct attached storage (DAS) device, a tape backup device, or essentially any other type of data storage device. Storage system 1200 may have a distributed architecture, or all of its components may be integrated into a single unit. Storage system 1200 may be implemented as part of an archive and/or backup system, or a disaster recovery system, such as a deduplicating storage system available from EMC® Corporation of Hopkinton, Mass.

In one embodiment, storage system 1200 includes deduplication logic 1201 interfacing one or more clients 1214, via file system 1203, with one or more storage units 1210 storing metadata 1216 and data objects 1218. Clients 1214 may be any kinds of clients, such as, for example, a client application, backup software, a garbage collector, or a storage management function, located locally or remotely over a network. A network may be any type of networks such as a local area network (LAN), a wide area network (WAN) such as the Internet, a corporate intranet, a metropolitan area network (MAN), a storage area network (SAN), a bus, or a combination thereof, wired and/or wireless.

Storage devices 1210 may be implemented locally (e.g., single node operating environment) or remotely (e.g., multi-node operating environment) via an interconnect, which may be a bus and/or a network (e.g., a storage network). In one embodiment, one of storage units 1210 operates as an active storage to receive and store external or fresh user data from a client (e.g., an end-user client or a primary storage system associated with one or more end-user clients), while the another one of storage units 1210 operates as a target storage unit to periodically archive data from the active storage unit according to an archiving policy or scheme. In one embodiment, storage devices or units are similar to or the same as the storage unit(s) 108-109 described in connection with FIG. 1. Storage units 1210 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 1210 may also be combinations of such devices. In the case of disk storage media, the storage units 1210 may be organized into one or more volumes of redundant array of inexpensive disks (RAID). Data stored in the storage units may be stored in a compressed form (e.g., lossless compression: HUFFMAN coding, LEMPEL-ZIV WELCH coding; delta encoding: a reference to a segment plus a difference; etc.). In one embodiment, different storage units may use different compression methods (e.g., main or active storage unit from other storage units, one storage unit from another storage unit, etc.).

The metadata, such as metadata 1216, may be stored in at least some of storage units 1210, such that files can be accessed independent of another storage unit. Metadata of each storage unit includes enough information to provide access to the files it contains. In one embodiment, metadata may include fingerprints or representatives contained within data objects 1218, where a data object may represent a data segment (also referred to as a data chunk), a compression region (CR) of one or more data segments, or a container of one or more CRs. Fingerprints are mapped to a particular data object via metadata 1216, enabling the system to identify the location of the data object containing a data segment represented by a particular fingerprint. A fingerprint may be generated based on at least a portion of a data segment, for example, by applying a predetermined mathematical algorithm (e.g., hash function) to at least a portion of the content of the data segment. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted. In one embodiment, metadata 1216 may include a file name, a storage unit identifier (ID) identifying a storage unit in which the segments associated with the file name are stored, reconstruction information for the file using the segments, and any other appropriate metadata information. Metadata 1216 may further include a segment ID, a segment sketch, a hash of a segment, an encrypted hash of a segment, random data, or any other appropriate metadata. In some embodiments, metadata associated with a segment is used to identify identical and/or similar data segments. The stored metadata enables a faster identification of identical and/or similar data segments as an ID and/or sketch (e.g., a set of values characterizing the segment) do not need to be recomputed for the evaluation of a given incoming data segment.

In one embodiment, a segment ID includes one or more deterministic functions of a data segment (also referred to as a data segment), one or more hash functions of a data segment, random data, or any other appropriate data segment ID. In various embodiments, a data segment sketch includes one or more deterministic functions of a data segment, one or more hash functions of a data segment, one or more functions that return the same or similar value for the same or similar data segments (e.g., a function that probably or likely returns a same value for a similar data segment), or any other appropriate data segment sketch. In various embodiments, sketch function values are determined to be similar using one or more of the following methods: numeric difference, hamming difference, locality-sensitive hashing, nearest-neighbor-search, other statistical methods, or any other appropriate methods of determining similarity. In one embodiment, sketch data includes one or more data patterns characterizing a segment. For example, a sketch may be generated by applying one or more functions (e.g., hash functions) on a segment and a subset of the results of the functions performed on the segment (e.g., a number of results, for example the ten lowest results or the ten highest results) are selected as a sketch.

In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for segments in storage units, identifying specific data objects).

In one embodiment, file system 1203 includes file service interface 1202, file system control logic 1208, directory manager 1222, and namespace 1220. Deduplication logic 1201 includes segmenter 1204 (also referred to as a segmenting module or unit), duplicate eliminator 1206, and storage unit interface 1212. File system control 1208 receives a file or files (or data item(s)) via file service interface 1202, which may be part of a file system namespace 1220 of file system 1203 associated with the deduplication logic 1201. The file system namespace 1220 refers to the way files are identified and organized in the system. An example is to organize the files hierarchically into directories or folders, which may be managed by directory manager 1222. File service interface 1212 supports a variety of protocols, including a network file system (NFS), a common Internet file system (CIFS), a direct access file system (DAFS), Hadoop distributed file system (HDFS), and a virtual tape library interface (VTL), etc.

The file(s) is/are processed by segmenter 1204 and file system control 1208. Segmenter 1204 (also referred to as a content store) breaks the file(s) into variable-length segments based on a variety of rules or considerations. For example, the file(s) may be broken into segments by identifying segment boundaries. Segment boundaries may be determined using file boundaries, directory boundaries, byte counts, content-based boundaries (e.g., when a hash of data in a window is equal to a value), or any other appropriate method of determining a boundary. Reconstruction of a data block, data stream, file, or directory includes using one or more references to the one or more segments that originally made up a data block, data stream, file, or directory that was/were previously stored. In some embodiments, segments are segmented by identifying segment boundaries that are content-based, such as, for example, a hash function is applied to values of data within a sliding window through the data stream or block and when the hash function is equal to a value (or equal to one of several values) then a segment boundary is identified. In various embodiments, segment boundaries are identified using content based functions operating on a sliding window within a data stream or block that have a minimum or maximum or other value or any other appropriate content based segmenting algorithm. In various embodiments, segments include fixed-length segments, variable length segments, overlapping segments, non-overlapping segments, segments with a minimum size, segments with a maximum size, or any other appropriate segments. In various embodiments, segments include files, groups of files, directories, a portion of a file, a portion of a data stream with one or more boundaries unrelated to file and/or directory boundaries, or any other appropriate segment.

In one embodiment, a segment boundary is determined using a value of a function calculated for multiple windows within a segmentation window. Values are computed that are associated with candidate boundaries within the segmentation window. One of the candidate boundaries is selected based at least in part on a comparison between two or more of the computed values. In one embodiment, a segmentation window can be determined by determining a first location corresponding to a minimum segment length and determining a second location corresponding to a maximum length, where data within the segmentation window is considered the segment from the first location to the second location.

Determining a boundary can include determining multiple windows within the segmentation window. Each window corresponds to a location within the segmentation window and is associated with a candidate boundary. In one embodiment, a function is then evaluated for each window. The function has as its inputs one or more data values of the window. In one embodiment, the function includes a hash function, such as, for example, SHA-1 (Secure Hash Algorithm 1), SHA-256, SHA-384, SHA-512, MD5 (Message-Digest algorithm 5), RIPEMD-160 (RACE Integrity Primitives Evaluation Message Digest 160-bit version), a Rabin hash, a fingerprint, a CRC (Cyclic Redundancy Check), a sum, an XOR, or any other appropriate function to distinguish a window. After the function values are generated for all windows, a boundary is selected based at least in part on the values that were generated, for example, the location corresponding to an extrema of a function value of all values generated, the location corresponding to the minimum value of all values generated is selected, the location corresponding to the maximum value of all values generated is selected, the location corresponding to a value with the longest run of 1 bits in its value of all values generated is selected, or the location corresponding to a value with the most 1 bits in its value of all values generated is selected. If there is tie for the value, criteria of selecting the location that maximizes or minimizes the segment length could be adopted.

In one embodiment, file system control 1208, also referred to as a file system manager, processes information to indicate the segment(s) association with a file. In some embodiments, a list of fingerprints is used to indicate segment(s) associated with a file. File system control 1208 passes segment association information (e.g., representative data such as a fingerprint) to index 1224. Index 1224 is used to locate stored segments in storage units 1210 via storage unit interface 1212. In one embodiment, index 1224 may include multiple entries, each entry corresponding one of the deduplicated segments. Each entry maps a representative or fingerprint of a deduplicated segment to a storage location identifier identifying a storage location storing the corresponding deduplicated segment. In one embodiment, each entry of index 1224 maps a fingerprint of a segment to a container identifier identifying a container that contains the corresponding segment. In one embodiment, the index 1224 includes at least one of indices 118, 123, or 124 that are each described above in connection with FIG. 1. In one embodiment, index 1224 includes a persistent hash-table of segment-IDs keyed either by the digest of the data stored in the segment or by the deduplication key of the data stored in the segment. The index 1224 need not contain entries for every data segment in the deduplication domain, but the effectiveness of deduplication is a function of the number of entries stored in the index 1224. Deduplication of data happens in two logically distinct operations: detection and remapping. The detection operation identifies blocks containing the same data. The remapping operation updates address maps that record physical locations of logical units of data so that a single block of data is shared by multiple logical units (LUNs) or by multiple positions within the same LUN. Detection is accomplished by building a database (e.g., index 1224) that maintains a digest (e.g., SHA, checksum) and a deduplication key for each data block. When two data blocks have the same digest they have a sufficiently high probability of containing the same data to warrant a bit-for-bit comparison to confirm they are exact duplicates. Remapping leverages dynamic block-mapping technology of a file system mapping driver. A file system allows dynamic manipulation of the address maps that connects LUN's logical address space to its physical address space.

Duplicate eliminator 1206, also referred to as a segment store, identifies whether a newly received segment has already been stored in storage units 1210. In the event that a segment has already been stored in storage unit(s), a reference to the previously stored segment is stored, for example, in a segment tree associated with the file, instead of storing the newly received segment. A segment tree of a file may include one or more nodes and each node represents or references one of the deduplicated segments stored in storage units 1210 that make up the file. Segments are then packed by a container manager (which may be implemented as part of storage unit interface 1212) into one or more storage containers stored in storage units 1210. The deduplicated segments may be further compressed into one or more CRs using a variation of compression algorithms, such as a Lempel-Ziv algorithm before being stored. A container may contain one or more CRs and each CR may contain one or more deduplicated segments (also referred to as deduplicated segments). A container may further contain the metadata such as fingerprints, sketches, type of the data segments, etc. that are associated with the data segments stored therein.

When a file is to be retrieved, file service interface 1202 is configured to communicate with file system control 1208 to identify appropriate segments stored in storage units 1210 via storage unit interface 1212. Storage unit interface 1212 may be implemented as part of a container manager. File system control 1208 communicates (e.g., via segmenter 1204) with index 1224 to locate appropriate segments stored in storage units via storage unit interface 1212. Appropriate segments are retrieved from the associated containers via the container manager and are used to construct the requested file. The file is provided via interface 1202 in response to the request. In one embodiment, file system control 1208 utilizes a tree (e.g., a segment tree obtained from namespace 1220) of content-based identifiers (e.g., fingerprints) to associate a file with data segments and their locations in storage unit(s). In the event that a segment associated with a given file or file changes, the content-based identifiers will change and the changes will ripple from the bottom to the top of the tree associated with the file efficiently since the appropriate content-based identifiers are easily identified using the tree structure.

In one embodiment, storage system 1200 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Note that some or all of the components as shown and described above (e.g., deduplication logic 1201) may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into a dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 13:
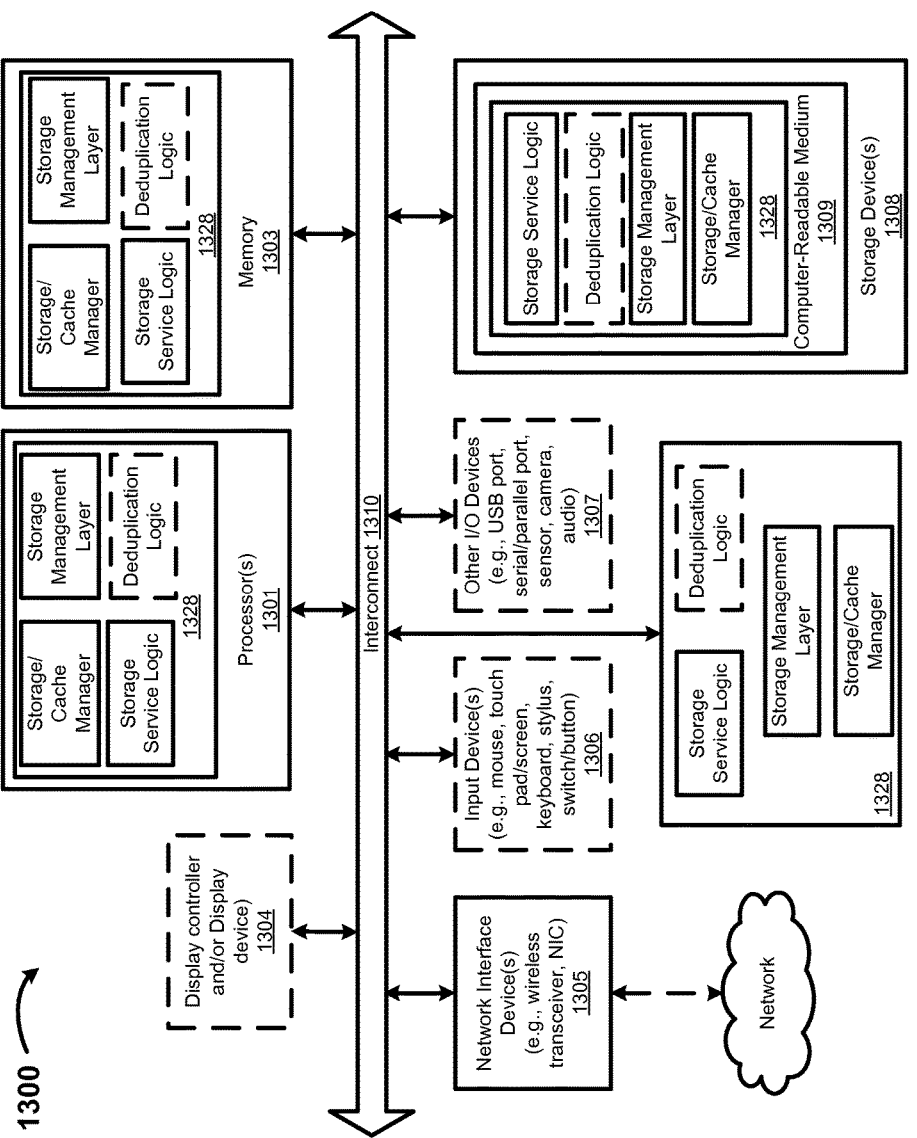
FIG. 13 is a block diagram illustrating a data processing system according to one embodiment.

FIG. 13 is a block diagram illustrating an example of a data processing system that may be used with one embodiment of the invention. For example, system 1300 may represents any of data processing systems described above performing any of the processes or methods described above. System 1300 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 1300 is intended to show a high level view of many components of the computer system. However, it is to be understood that additional components may be present in certain implementations and furthermore, different arrangement of the components shown may occur in other implementations. System 1300 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1300 includes processor 1301, memory 1303, and devices 1305-1308 via a bus or an interconnect 1310. Processor 1301 may represent a single processor or multiple processors with a single processor core or multiple processor cores included therein. Processor 1301 may represent one or more general-purpose processors such as a microprocessor, a central processing unit (CPU), or the like. More particularly, processor 1301 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1301 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 1301, which may be a low power multi-core processor socket such as an ultra-low voltage processor, may act as a main processing unit and central hub for communication with the various components of the system. Such processor can be implemented as a system on chip (SoC). Processor 1301 is configured to execute instructions for performing the operations and steps discussed herein. System 1300 may further include a graphics interface that communicates with optional graphics subsystem 1304, which may include a display controller, a graphics processor, and/or a display device.

Processor 1301 may communicate with memory 1303, which in one embodiment can be implemented via multiple memory devices to provide for a given amount of system memory. Memory 1303 may include one or more volatile storage (or memory) devices such as random access memory (RAM), dynamic RAM (DRAM), synchronous DRAM (SDRAM), static RAM (SRAM), or other types of storage devices. Memory 1303 may store information including sequences of instructions that are executed by processor 1301, or any other device. For example, executable code and/or data of a variety of operating systems, device drivers, firmware (e.g., input output basic system or BIOS), and/or applications can be loaded in memory 1303 and executed by processor 1301. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 1300 may further include IO devices such as devices 1305-1308, including network interface device(s) 1305, optional input device(s) 1306, and other optional IO device(s) 1307. Network interface device 1305 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1306 may include a mouse, a touch pad, a touch sensitive screen (which may be integrated with display device 1304), a pointer device such as a stylus, and/or a keyboard (e.g., physical keyboard or a virtual keyboard displayed as part of a touch sensitive screen). For example, input device 1306 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

I/O devices 1307 may include an audio device. An audio device may include a speaker and/or a microphone to facilitate voice-enabled functions, such as voice recognition, voice replication, digital recording, and/or telephony functions. Other I/O devices 1307 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1307 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1310 via a sensor hub (not shown), while other devices such as a keyboard or thermal sensor may be controlled by an embedded controller (not shown), dependent upon the specific configuration or design of system 1300.

To provide for persistent storage of information such as data, applications, one or more operating systems and so forth, a mass storage (not shown) may also couple to processor 1301. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. In addition, a flash device may be coupled to processor 1301, e.g., via a serial peripheral interface (SPI). This flash device may provide for non-volatile storage of system software, including basic input/output software (BIOS) as well as other firmware of the system.

Storage device 1308 may include computer-accessible storage medium 1309 (also known as a machine-readable storage medium or a computer-readable medium) on which is stored one or more sets of instructions or software (e.g., module, unit, and/or logic 1328) embodying any one or more of the methodologies or functions described herein. Module/unit/logic 1328 may also reside, completely or at least partially, within memory 1303 and/or within processor 1301 during execution thereof by data processing system 1300, memory 1303, and processor 1301 constituting machine-accessible storage media. Module/unit/logic 1328 may further be transmitted or received over a network via network interface device 1305.

Computer-readable storage medium 1309 may also be used to store the some software functionalities described above persistently. While computer-readable storage medium 1309 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media, or any other non-transitory machine-readable medium.

Module/unit/logic 1328, components and other features described herein can be implemented as discrete hardware components or integrated in the functionality of hardware components such as ASICS, FPGAs, DSPs or similar devices. In addition, module/unit/logic 1328 can be implemented as firmware or functional circuitry within hardware devices. Further, module/unit/logic 1328 can be implemented in any combination hardware devices and software components.

Note that while system 1300 is illustrated with various components of a data processing system, it is not intended to represent any particular architecture or manner of interconnecting the components; as such details are not germane to embodiments of the present invention. It will also be appreciated that network computers, handheld computers, mobile phones, servers, and/or other data processing systems, which have fewer components or perhaps more components, may also be used with embodiments of the invention.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for optimizing a cache memory device of a storage system, the method comprising:

caching a first base segment tree in a cache memory device, the first base segment tree representing deduplicated segments of a file that is stored in a storage disk of a storage system;

in response to a plurality of changes of the file subsequently received from a client at different points in time, caching in the cache memory device a plurality of incremental segment trees corresponding to the changes of the file, without modifying the first base segment tree in response to the changes, wherein one or more of the incremental segment trees together with the first base segment tree collectively represent a different one of the changes at a particular time; and merging two or more of the incremental segment trees into an updated incremental segment tree to reduce a storage space of the cache memory device to store the incremental segment trees, wherein the updated incremental segment tree comprises data and metadata represented by two or more incremental segment trees, wherein merging two or more of the incremental segment trees into an updated incremental segment tree comprises:
  determining whether two or more of the incremental segment trees stored in the cache memory device exceeds a predetermined threshold;
  when the predetermined threshold is exceeded, merging the two or more of the incremental segment trees into the undated incremental segment tree; and
  removing at least one of the two or more incremental segment trees from the cache memory device.

2. The method of claim 1, wherein merging two or more of the incremental segment trees is performed in response to a request for cache eviction to make room for storing other data in the cache memory device.

3. The method of claim 1, wherein merging two or more of the incremental segment trees is performed in response to a subsequent request for accessing data associated with at least one of the deduplicated segments represented by at least one of the incremental segment trees.

4. The method of claim 1, wherein merging two or more of the incremental segment trees is periodically performed to reduce a number of incremental segment trees stored in the cache memory device.

5. A computer-implemented method for optimizing a cache memory device of a storage system, the method comprising:
  caching a first base segment tree in a cache memory device, the first base segment tree representing deduplicated segments of a file that is stored in a storage disk of a storage system;
  in response to a plurality of changes of the file subsequently received from a client at different points in time, caching in the cache memory device a plurality of incremental segment trees corresponding to the changes of the file, without modifying the first base segment tree in response to the changes, wherein one or more of the incremental segment trees together with the first base segment tree collectively represent a different one of the changes at a particular time;
  merging two or more of the incremental segment trees into an updated incremental segment tree to reduce a storage space of the cache memory device to store the incremental segment trees, wherein the updated incremental segment tree comprises data and metadata represented by two or more incremental segment trees;
  determining whether a number of merges of incremental segment trees exceeds a predetermined threshold;
  when the number of merges exceeds the predetermined threshold, merging the updated incremental segment tree with the first base segment tree to generate a second base segment tree, the second base segment tree being an updated base segment that includes data and metadata of both the first base segment tree and the updated incremental segment tree; and
  storing the second base segment tree in the storage disk to replace the first base segment tree stored therein.

6. The method of claim 5, wherein the second base segment tree is written to the storage disk in response to a signal indicating that a current access session to the file has been closed.

7. A storage system, comprising:
  one or more storage units configured to:
  store a first base segment tree, the first base segment tree representing deduplicated segments of a file that is stored in the one or more storage units; and
  a cache memory device configured to:
  cache the first base segment tree;
  in response to a plurality of changes of the file subsequently received from a client at different points in time, cache a plurality of incremental segment trees corresponding to the changes of the file, without modifying the first base segment tree in response to the changes, wherein one or more of the incremental segment trees together with the first base segment tree collectively represent a different one of the changes at a particular time; and
  merge two or more of the incremental segment trees into an updated incremental segment tree to reduce a storage space of the cache memory device to store the incremental segment trees, wherein the updated incremental segment tree comprises data and metadata represented by two or more incremental segment trees, wherein merging two or more of the incremental segment trees into an updated incremental segment tree comprises:
    determining whether two or more of the incremental segment trees stored in the cache memory device exceeds a predetermined threshold;
    when the predetermined threshold is exceeded, merging the two or more of the incremental segment trees into the updated incremental segment tree; and
    removing at least one of the two or more incremental segment trees from the cache memory device.

8. The storage system of claim 7, wherein merging two or more of the incremental segment trees is performed in response to a request for cache eviction to make room for storing other data in the cache memory device.

9. The storage system of claim 7, wherein merging two or more of the incremental segment trees is performed in response to a subsequent request for accessing data associated with at least one of the deduplicated segments represented by at least one of the incremental segment trees.

10. The storage system of claim 7, wherein merging two or more of the incremental segment trees is periodically performed to reduce a number of incremental segment trees stored in the cache memory device.

11. A storage system comprising:
  one or more storage units configured to:
  store a first base segment tree, the first base segment tree representing deduplicated segments of a file that is stored in the one or more storage units;
  a cache memory device configured to:
  cache the first base segment tree;
  in response to a plurality of changes of the file subsequently received from a client at different points in time, cache a plurality of incremental segment trees corresponding to the changes of the file, without modifying the first base segment tree in response to the changes, wherein one or more of the incremental segment trees together with the first base segment tree collectively represent a different one of the changes at a particular time; and
  merge two or more of the incremental segment trees into an updated incremental segment tree to reduce a storage space of the cache memory device to store the incremental segment trees, wherein the updated incremental segment tree comprises data and metadata represented by two or more incremental segment trees; and
  a storage/cache manager executed on a processor that is configured to:
    determine whether a number of merges of incremental segment trees exceeds a predetermined threshold;

when the number of merges exceeds the predetermined threshold, the cache memory device is further configured to:
    merge the updated incremental segment tree with the first base segment tree to generate a second base segment tree, the second base segment tree being an updated base segment that includes data and metadata of both the first base segment tree and the updated incremental segment tree; and
the one or more storage units are further configured to:
    store the second base segment tree to replace the first base segment tree stored therein.

12. The storage system of claim 11, wherein the second base segment tree is written to the one or more storage units in response to a signal indicating that a current access session to the file has been closed.

13. A non-transitory computer-readable storage medium having instructions stored therein, which when executed by a processor, cause the processor to perform operations for optimizing a cache memory device of a storage system, the operations comprising:
    caching a first base segment tree in a cache memory device, the first base segment tree representing deduplicated segments of a file that is stored in a storage disk of a storage system;
    in response to a plurality of changes of the file subsequently received from a client at different points in time, caching in the cache memory device a plurality of incremental segment trees corresponding to the changes of the file, without modifying the first base segment tree in response to the changes, wherein one or more of the incremental segment trees together with the first base segment tree collectively represent a different one of the changes at a particular time;
    merging two or more of the incremental segment trees into an updated incremental segment tree to reduce a storage space of the cache memory device to store the incremental segment trees, wherein the updated incremental segment tree comprises data and metadata represented by two or more incremental segment trees, wherein merging two or more of the incremental segment trees into an updated incremental segment tree comprises:
        determining whether two or more of the incremental segment trees stored in the cache memory device exceeds a predetermined threshold;
        when the predetermined threshold is exceeded, merging the two or more of the incremental segment trees into the undated incremental segment tree; and
        removing at least one of the two or more incremental segment trees from the cache memory device.

14. The non-transitory computer-readable storage medium of claim 13, wherein merging two or more of the incremental segment trees is performed in response to a request for cache eviction to make room for storing other data in the cache memory device.

15. The non-transitory computer-readable storage medium of claim 13, wherein merging two or more of the incremental segment trees is performed in response to a subsequent request for accessing data associated with at least one of the deduplicated segments represented by at least one of the incremental segment trees.

16. The non-transitory computer-readable storage medium of claim 13, wherein merging two or more of the incremental segment trees is periodically performed to reduce a number of incremental segment trees stored in the cache memory device.

17. A non-transitory computer-readable storage medium having instructions stored therein, which when executed by a processor, cause the processor to perform operations for optimizing a cache memory device of a storage system, the operations comprising:
    caching a first base segment tree in a cache memory device, the first base segment tree representing deduplicated segments of a file that is stored in a storage disk of a storage system;
    in response to a plurality of changes of the file subsequently received from a client at different points in time, caching in the cache memory device a plurality of incremental segment trees corresponding to the changes of the file, without modifying the first base segment tree in response to the changes, wherein one or more of the incremental segment trees together with the first base segment tree collectively represent a different one of the changes at a particular time;
    merging two or more of the incremental segment trees into an updated incremental segment tree to reduce a storage space of the cache memory device to store the incremental segment trees, wherein the updated incremental segment tree comprises data and metadata represented by two or more incremental segment trees;
    determining whether a number of merges of incremental segment trees exceeds a predetermined threshold;
    when the number of merges exceeds the predetermined threshold, merging the updated incremental segment tree with the first base segment tree to generate a second base segment tree, the second base segment tree being an updated base segment that includes data and metadata of both the first base segment tree and the updated incremental segment tree; and
    storing the second base segment tree in the storage disk to replace the first base segment tree stored therein.

18. The non-transitory computer-readable storage medium of claim 17, wherein the second base segment tree is written to the storage disk in response to a signal indicating that a current access session to the file has been closed.

* * * * *